United States Patent
Lee et al.

(10) Patent No.: US 10,671,282 B2
(45) Date of Patent: *Jun. 2, 2020

(54) DISPLAY DEVICE INCLUDING BUTTON CONFIGURED ACCORDING TO DISPLAYED WINDOWS AND CONTROL METHOD THEREFOR

(71) Applicant: Samsung Electronics Co., Ltd., Suwon-si, Gyeonggi-do (KR)

(72) Inventors: Seung-Woon Lee, Suwon-si (KR); Kang-Tae Kim, Yongin-si (KR); Young-Jin Kim, Suwon-si (KR); Dae-Wook Park, Suwon-si (KR); Jung-Hwan Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,684

(22) Filed: Dec. 31, 2019

(65) Prior Publication Data

US 2020/0133488 A1  Apr. 30, 2020

Related U.S. Application Data

(63) Continuation of application No. 16/055,670, filed on Aug. 6, 2018, now Pat. No. 10,521,110, which is a
(Continued)

(51) Int. Cl.
*G06F 3/0481* (2013.01)
*G09G 5/14* (2006.01)
(Continued)

(52) U.S. Cl.
CPC ........ *G06F 3/04886* (2013.01); *G06F 3/0481* (2013.01); *G06F 3/0484* (2013.01);
(Continued)

(58) Field of Classification Search
CPC .. G06F 3/04886; G06F 3/0484; G06F 3/0481; G06F 2203/04803; G09G 5/14; G09G 2340/0464; G09G 2340/045
See application file for complete search history.

(56) References Cited

U.S. PATENT DOCUMENTS 6,008,809 A  12/1999 Brooks
7,305,630 B2 * 12/2007 Hullender ........... G06F 3/04883
345/173
(Continued)

FOREIGN PATENT DOCUMENTS

JP    744351 A    2/1995
JP   11-110099 A  4/1999
(Continued)

OTHER PUBLICATIONS

Professor2010, Youtube video, "How to use split view in Microsoft Excel", https://www.youtube.com/watch?v=6JNMjjaymTI, Uploaded on Jun. 26, 2010.
(Continued)

*Primary Examiner* — Tapas Mazumder
(74) *Attorney, Agent, or Firm* — Jefferson IP Law, LLP

(57) ABSTRACT

A method for controlling a display device comprising a touch screen is provided. The control method displaying, on the touch screen, a plurality of windows that do not overlap one another and that respectively correspond to executing, displaying a center button disposed at an intersection of a plurality of dividing lines that distinguishes the plurality of windows, receiving an input of a window size change command for changing a size of at least one of the plurality of windows, changing the size of at least one of the plurality of windows in response to the window size change com-
(Continued)

mand, and discontinuing the displaying of less than all of the plurality of windows and enlarging a size of at least one remaining window.

11 Claims, 28 Drawing Sheets

Related U.S. Application Data continuation of application No. 14/649,451, filed as application No. PCT/KR2013/011306 on Dec. 6, 2013, now abandoned.

(60) Provisional application No. 61/740,887, filed on Dec. 21, 2012, provisional application No. 61/737,540, filed on Dec. 14, 2012, provisional application No. 61/734,097, filed on Dec. 6, 2012.

(51) Int. Cl.
  *G06F 3/0488* (2013.01)
  *G06F 3/0484* (2013.01)

(52) U.S. Cl.
  CPC ..... *G09G 5/14* (2013.01); *G06F 2203/04803* (2013.01); *G09G 2340/045* (2013.01); *G09G 2340/0464* (2013.01)

(56) References Cited

U.S. PATENT DOCUMENTS

| | | |
|---|---|---|
| 7,437,678 B2 | 10/2008 | Awada et al. |
| 2008/0158189 A1 | 7/2008 | Kim |
| 2010/0138767 A1 | 6/2010 | Wang et al. |
| 2010/0248788 A1 | 9/2010 | Yook et al. |
| 2011/0105187 A1* | 5/2011 | Dobroth ................ G06F 3/0481 |
| | | 455/566 |
| 2012/0054671 A1 | 3/2012 | Thompson et al. |
| 2013/0117715 A1* | 5/2013 | Williams ............ G06F 3/04883 |
| | | 715/835 |

FOREIGN PATENT DOCUMENTS

| | | |
|---|---|---|
| JP | 3611956 B2 | 10/2004 |
| JP | 2008-227679 A | 9/2008 |
| JP | 2009-005258 A | 1/2009 |
| KR | 10-2007-0001771 A | 1/2007 |
| KR | 10-2010-0048297 A | 5/2010 |
| KR | 10-2011-0129750 A | 12/2011 |
| KR | 10-2012-0059909 A | 6/2012 |

OTHER PUBLICATIONS

Korean Office Action dated Apr. 6, 2020, issued in Korean Patent Application No. 10-2013-0150785.

* cited by examiner

DISPLAY DEVICE INCLUDING BUTTON CONFIGURED ACCORDING TO DISPLAYED WINDOWS AND CONTROL METHOD THEREFOR

CROSS-REFERENCE TO RELATED APPLICATION(S)

This application is a continuation application of prior application Ser. No. 16/055,670, filed on Aug. 6, 2018, which has issued as U.S. Pat. No. 10,521,110 on Dec. 31, 2019 and is a continuation application of prior application Ser. No. 14/649,451, filed on Jun. 3, 2015, which was a U.S. National Stage application under 35 U.S.C. § 371 of an International application filed on Dec. 6, 2013 and assigned application number PCT/KR2013/011306, which was based on and claimed priority of a U.S. Provisional application filed on Dec. 6, 2012 in the U.S. Patent and Trademark Office and assigned Ser. No. 61/734,097, and of a U.S. Provisional application filed on Dec. 14, 2012 in the U.S. Patent and Trademark Office and assigned Ser. No. 61/737,540, and of a U.S. Provisional application filed on Dec. 21, 2012 filed in the U.S. Patent and Trademark Office and assigned Ser. No. 61/740,887, and of a Korean patent application filed on Feb. 1, 2013 in the Korean Intellectual Property Office and assigned Serial number 10-2013-0011933, and of a Korean patent application filed on Aug. 13, 2013 in the Korean Intellectual Property Office and assigned Serial number 10-2013-0096206, the entire disclosure of each of which is hereby incorporated by reference.

TECHNICAL FIELD

The present disclosure relates to a display device and a controlling method. More particularly, the present disclosure relates to a display device and a controlling method that controls the display of a window where an application is executed.

BACKGROUND

A desktop computer has at least one display device (for example, a monitor). A mobile device (for example, a portable phone, a smart phone, or a tablet personal computer (PC)) which uses a touch screen, has a display device.

A user of the desktop computer may divide a screen of the display device according to a working environment (for example, horizontally or vertically divide the screen while displaying a plurality of windows) and use the divided screens. When a web browser is executed, the user may move in the upward or downward direction of the webpage by using a page up button or a page down button arranged in a keyboard. When a mouse is used instead of a keyboard, the user may move in the upward or downward direction of the webpage by selecting a scroll bar disposed on a side of the webpage with a cursor of the mouse. Also, the user may move to the top of the webpage by selecting a top button that is expressed in text or an icon disposed at the bottom of the webpage.

The mobile device has a smaller size of the displayed screen in comparison with the desktop computer and a limitation in an input. The user has a difficulty in dividing the screen and using the same. Further, the mobile device may execute various applications such as basic applications produced by a manufacturer of the mobile device and then installed in the mobile device, and additional applications downloaded from an application selling site through the Internet. The additional applications may be developed by general users and registered in the application selling site. Accordingly, anyone can freely sell applications developed by himself/herself to users of the mobile device through the application selling site. Accordingly, tens of thousands to hundreds of thousands of free or for sale applications are provided to current mobile devices according to a type of product.

Although various applications which simulate consumers' curiosity and satisfy consumers' demands are provided to the mobile device, the mobile device is provided to have a portable size, a size and a user interface (UI) thereof may be limited. Accordingly, the users feel inconvenience in executing a plurality of applications in the mobile device.

Accordingly, there is a desire for a technology that displays a plurality of windows on a single display. Also, there is a desire for a technology that easily executes a plurality of windows, and readily deploys the windows after the execution.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display device and a controlling method that executes a plurality of windows on a single display, and controls a deployment of the plurality of windows after the execution.

In accordance with an aspect of the present disclosure, a method of controlling a display device including a touch screen, is provided. The method includes displaying, on the touch screen, a plurality of windows that do not overlap one another and that respectively correspond to executing applications, displaying a center button disposed at an intersection of a plurality of dividing lines that distinguishes the plurality of windows, receiving an input of a window size change command for changing a size of at least one of the plurality of windows, changing the size of at least one of the plurality of windows in response to the window size change command, and discontinuing the displaying of less than all of the plurality of windows and enlarging a size of at least one remaining window.

In accordance with another aspect of the present disclosure, a display device is provided. The device includes a touch screen configured to display a plurality of windows that do not overlap one another and that respectively correspond to executing applications, and to display a center button disposed at an intersection of a plurality of dividing lines that distinguishes the plurality of windows, and a controller configured to control to change a size of at least one of the plurality of windows in response to a window size change command when the window size change command is input, and to control to discontinue the display of less than all of the plurality of windows and enlarge a size of at least one remaining window.

In accordance with another aspect of the present disclosure, a method of controlling a display of a touch screen is provided. The method includes displaying, on the touch screen, a plurality of windows, displaying a center button at an intersection of a plurality of dividing lines that distinguishes the plurality of windows, and changing a size of at least one of the plurality of windows in response to a movement of the center button.

According to various embodiments of the present disclosure, there is provided a display device and a controlling method thereof, which executes a plurality of windows on a single display, and controls the deployment of the plurality of windows after the execution. Accordingly, a user may use, in parallel, a plurality of applications displayed on the plurality of windows. Additionally, the user may readily manipulate the deployment of the plurality of applications and thus, user convenience may be maximized. Further, the user may easily switch between a full-screen mode and a division mode.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
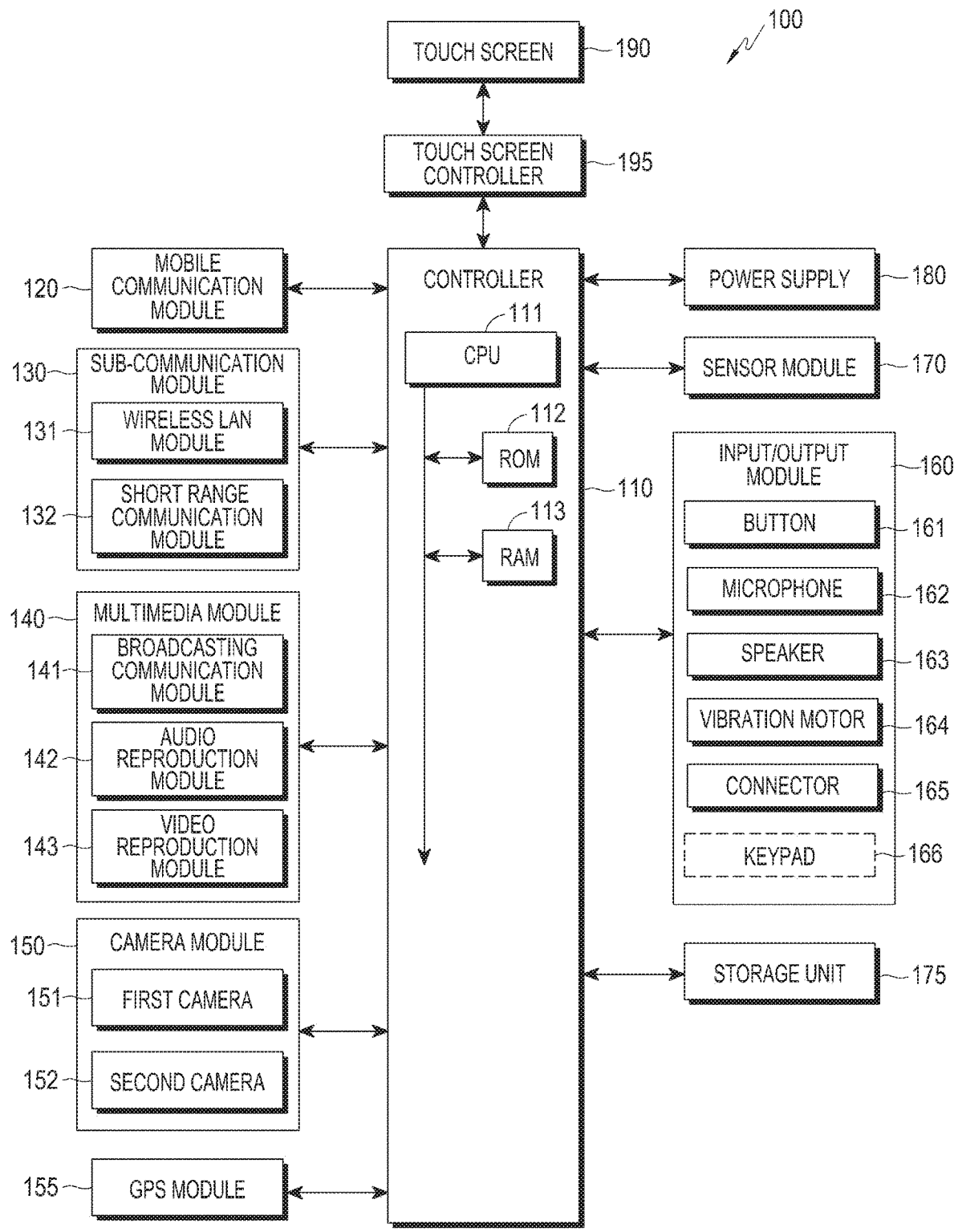
FIG. 1 is a block diagram schematically illustrating a device according to an embodiment of the present disclosure.

FIG. 1 is a block diagram schematically illustrating a device according to an embodiment of the present disclosure.

Referring to FIG. 1, a display device 100 may be connected to an external device (not shown) using a mobile communication module 120, a sub-communication module 130, and a connector 165. The external device may include another device (not illustrated), a mobile phone (not illustrated), a smart phone (not illustrated), a tablet personal computer (PC) (not illustrated), and a server (not illustrated).

Referring to FIG. 1, the display device 100 is configured to include a touch screen 190 and a touch screen controller 195. Also, the display device 100 is configured to include a controller 110, the mobile communication module 120, the sub-communication module 130, a multimedia module 140, a camera module 150, a global positioning system (GPS) module 155, an input/output module 160, a sensor module 170, a storage unit 175, and a power supply 180. The sub-communication module 130 is configured to include at least one of a wireless local area network (LAN) module 131 and a short range communication module 132, and the multimedia module 140 is configured to include at least one of a broadcasting communication module 141, an audio reproduction module 142, and a video reproduction module 143. The camera module 150 is configured to include at least one of a first camera 151 and a second camera 152, and the input/output module 160 is configured to include at least one of a button 161, a microphone 162, a speaker 163, a vibration motor 164, and a connector 165, and a keypad 166.

The controller 110 may be configured to include a central processing unit (CPU) 111, a read only memory (ROM) 112 that stores a control program for controlling the display device 100, and a random access memory (RAM) 113 that stores a signal or data input from the outside of the display device 100 or that is used as a storage area for an operation performed in the display device 100. The CPU 111 may include a single core, a dual core, a triple core, or a quad core. The CPU 111, the ROM 112 and the RAM 113 may be connected with each other through internal buses.

The controller 110 may control the mobile communication module 120, the sub-communication module 130, the multimedia module 140, the camera module 150, the GPS module 155, the input/output module 160, the sensor module 170, the storage unit 175, the power supply 180, a touch screen 190, and the touch screen controller 195.

The mobile communication module 120 connects the display device 100 with an external device through mobile communication using at least one antenna (one or more antennas) (not shown) according to a control of the controller 110. The mobile communication module 120 transmits/receives a wireless signal for a voice call, a video call, a short message service (SMS), or a multimedia message service (MMS) to/from a mobile phone (not shown), a smart phone (not shown), a tablet personal computer (PC), or another device (not shown), which has a phone number input into the display device 100.

The sub-communication module 130 may be configured to include at least one of the wireless LAN module 131 and the short range communication module 132. For example, the sub-communication module 130 may include only the wireless LAN module 131, only the short range communication module 132, or both the wireless LAN module 131 and the short range communication module 132.

The wireless LAN module 131 may connect to the Internet according to a control of the controller 110 in a place where a wireless access point (AP) (not illustrated) is installed. The wireless LAN module 131 supports a wireless LAN standard (IEEE802.11x) of the Institute of Electrical and Electronics Engineers (IEEE). The short range communication module 132 may wirelessly perform near field communication between the display device 100 and a video forming device (not shown) according to a control of the controller 110. The short range communication scheme may include, for example, Bluetooth, infrared data association (IrDA) communication, Zig-bee scheme, and the like.

The display device 100 may include at least one of the mobile communication module 120, the wireless LAN module 131, and the short range communication module 132, depending on the capability of the device. For example, the display device 100 may include a combination of the mobile communication module 120, the wireless LAN module 131, and the short range communication module 132 according to the capability of the display device 100.

The multimedia module 140 may be configured to include the broadcasting communication module 141, the audio reproduction module 142 and the video reproduction module 143. The broadcasting communication module 141 may receive a broadcasting signal (for example, a television (TV) broadcasting signal, a radio broadcasting signal, or a data broadcasting signal) and broadcasting supplement information (for example, electric program guide (EPG) or electric service guide (ESG)), output from a broadcasting station through a broadcasting communication antenna (not shown) under a control of the controller 110. The audio reproduction module 142 may reproduce a stored or received digital audio file (for example, a file of which the file extension is mp3, wma, ogg, or wav) under a control of the controller 110. The video reproduction module 143 may reproduce a stored or received digital video file (for example, a file having a file extension of mpeg, mpg, mp4, avi, mov, or mkv) under a control of the controller 110. The video reproduction module 143 may reproduce a digital audio file.

The multimedia module 140 may include the audio reproduction module 142 and the video reproduction module 143, excluding the broadcasting communication module 141. Further, the audio reproduction module 142 or the video reproduction module 143 of the multimedia module 140 may be included in the controller 110.

The camera module 150 may include at least one of the first camera 151 and the second camera 152, which photograph a still image or a video, under a control of the controller 110. Further, the first camera 151 or the second camera 152 may include a supplementary light source (for example, a flash (not shown)) that provides an amount of light used for photographing. The first camera 151 may be disposed in the front side of the display device 100, and the second camera 152 may be disposed in the rear side of the display device 100. In a different way, the first camera 151 and the second camera 152 are arranged adjacent to each other (for example, an interval between the first camera 151 and the second camera 152 is larger than 1 cm or smaller than 8 cm) to photograph a three dimensional (3D) still image or a 3D video.

The GPS module 155 may receive a radio wave from a plurality of GPS satellites (not shown) in Earth orbit and calculate a position of the display device 100 using a Time of Arrival from the GPS satellites (not shown) to the display device 100.

The input/output module 160 may include at least one entity, from among the plurality of buttons 161, the microphone 162, the speaker 163, the vibration motor 164, the connector 165, and the keypad 166.

The buttons 161 may be formed in the front side, a lateral side, or the rear side of the housing of the display device 100, and may include at least one of a power/lock button (not shown), a volume button (not shown), a menu button, a home button, a back button, and a search button.

The microphone 162 receives a voice or a sound and generates an electrical signal under a control of the controller 110.

The speaker 163 may output sounds corresponding to various signals (for example, a wireless signal, a broadcasting signal, a digital audio file, a digital video file, a photographing signal or the like) of the mobile communication module 120, the sub-communication module 130, the multimedia module 140, or the camera module 150, to the outside of the display device 100 according to a control of the controller 110. The speaker 163 may output sounds (for example, a button control sound or a ring back tone corresponding to phone call) corresponding to functions performed by the display device 100. One or more speakers 163 may be formed in a proper position or positions of the housing of the display device 100.

The vibration motor 164 may convert an electrical signal into a mechanical vibration under a control of the controller 110. For example, when the display device 100 in a vibration mode receives a voice call from another device (not shown), the vibration motor 164 operates. One or more vibration motors 164 may be formed within the housing of the display device 100. The vibration motor 164 may operate in response to a touch operation of a user who touches the touch screen 190, and a continuous movement of a touch on the touch screen 190.

The connector 165 may be used as an interface for connecting the display device 100 with an external device (not shown) or a power source (not shown). The connector 165 may transmit data stored in the storage unit 175 of the display device 100 to an external device (not shown) through a wired cable connected to the connector 165 or receive the data from an external device (not shown) according to a control of the controller 110. The display device 100 may receive electric power from a power source (not shown) or charge a battery (not shown), through the wired cable connected to the connector 165.

The keypad 166 may receive a key input from a user to control the display device 100. The keypad 166 includes a physical keypad (not shown) formed in the display device 100 or a virtual keypad (not shown) displayed on the touch screen 190. The physical keypad (not shown) formed in the display device 100 may be omitted according to a capability or a structure of the display device 100.

The sensor module 170 includes at least one sensor for detecting a state of the display device 100. For example, the sensor module 170 may include a proximity sensor for detecting whether a user is close to the display device 100, an illumination sensor (not shown) for detecting an amount of light around the display device 100, or a motion sensor (not shown) for detecting a motion of the display device 100 (for example, a rotation of the display device 100, or an acceleration or vibration applied to the display device 100). At least one sensor may detect the state, generate a signal corresponding to the detection, and transmit the generated signal to the controller 110. The sensor of the sensor module 170 may be added or omitted according to a capability of the display device 100.

The storage unit 175 may store signals or data which are input/output in association with an operation of the mobile communication module 120, the sub-communication module 130, the multimedia module 140, the camera module 150, the GPS module 155, the input/output module 160, the sensor module 170, and the touch screen 190 under a control of the controller 110. The storage unit 175 may store a control program for controlling the display device 100 or the controller 110, and applications.

The term "storage unit" refers to the storage unit 175, the ROM 112 and the RAM 113 included in the controller 110, or a memory card (not illustrated) (for example, a secure digital (SD) card or a memory stick) mounted in the display device 100. The storage unit may include a non-volatile memory, a volatile memory, a hard disk drive (HDD), and a solid state drive (SSD).

The power supply 180 may supply power to one battery or a plurality of batteries (not shown) disposed in the housing of the display device 100 according to a control of the controller 110. The one or more batteries (not shown) supply power to the display device 100. Further, the power supply 180 may supply, to the display device 100, power input from an external power source (not shown) through the wired cable connected to the connector 165.

The touch screen 190 may provide a user with user interfaces (UIs) corresponding to various services (for example, a call, data transmission, broadcasting, and photographing). The touch screen 190 may transmit, to the touch screen controller 195, an analog signal corresponding to at least one touch, which is input into a UI. The touch screen 190 may receive at least one touch through a user's body part (for example, fingers including a thumb) or a touchable input means (for example, a stylus pen). Further, the touch screen 190 may receive a continuous movement of one touch, among at least one touch. The touch screen 190 may transmit an analog signal, which corresponds to the continuous movement of the input touch, to the touch screen controller 195.

In addition, the touch is not limited to a contact between the touch screen 190 and a body part of a user or a touchable input means, but includes a non-contact (for example, the case where an interval between the touch screen 190 and the user's body part or the touchable input means is 1 mm or shorter). An interval that may be detected by the touch screen 190 may be changed according to a capability or a structure of the display device 100.

The touch screen 190, for example, may be implemented in a resistive type, a capacitive type, an infrared type, or an acoustic wave type.

The touch screen controller 195 converts the analog signal received from the touch screen 190 to a digital signal (for example, X and Y coordinates), and transmits the digital signal to the controller 110. The controller 110 may control the touch screen 190 using the digital signal received from the touch screen controller 195. For example, the controller 110 may allow a shortcut icon (not shown) displayed on the touch screen 190 to be selected or executed in response to a touch. Further, the touch screen controller 195 may be included in the controller 110.

FIGS. 2A through 2K are conceptual diagrams illustrating a window execution method, according to an embodiment of the present disclosure. Those skilled in the art will appreciate that a display device 200 may be embodied in various forms such as a normal TV, an Internet TV, a medical data display device, or the like, in addition to the mobile device that has been described with reference to FIG. 1. That is, there is no limit to the display device, when it is a device including a means that displays a rendered image.

Figure 2A:
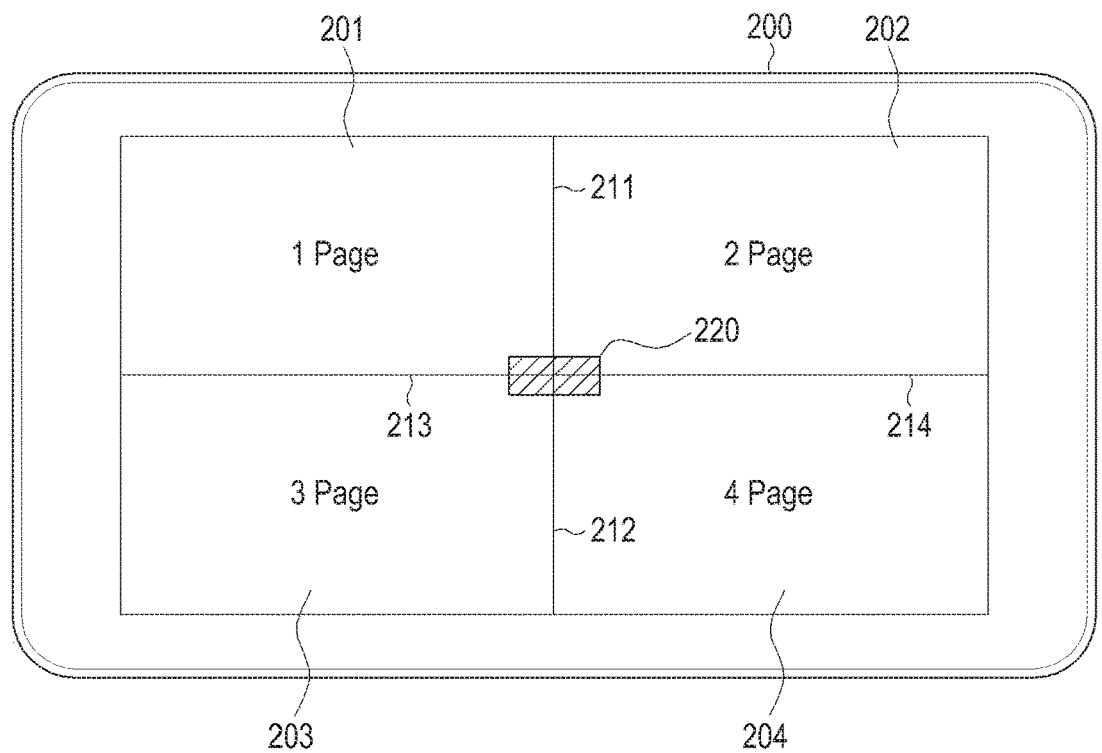
FIGS. 2A, 2B, 2C, 2D, 2E, 2F, 2G, 2H, 2I, 2J, and 2K are conceptual diagrams illustrating a window execution method, according to an embodiment of the present disclosure.

As illustrated in FIG. 2A, the display device 200 may set a plurality of window display spaces 201 to 204, on a touch screen. Particularly, a controller (not illustrated) may set a first area 201, a second area 202, a third area 203, and a fourth area 204. Although FIG. 2A illustrates an example in which four areas for windows are set on the touch screen, this is merely an example and the present disclosure may set at least two windows on the touch screen. Also, the controller (not illustrated) may set a first dividing line 211 that distinguishes the first area 201 and the second area 202, a second dividing line 212 that distinguishes the third area 203 and the fourth area 204, a third dividing line 213 that distinguishes the first area 201 and the third area 203, and a fourth dividing line 214 that distinguishes the second area 202 and the fourth area 204. Here, the first dividing line 211 and the second dividing line 212 are in a single line, and the third dividing line 213 and the fourth dividing line 214 are in a single line. The controller (not illustrated) may set the first area 201 to the fourth area 204 to not overlap one another. For example, as illustrated in FIG. 2A, the controller (not illustrated) may set the first area 201 on the top left side, set the second area 202 on the top right side, set the third area 203 on the bottom left side, and set the fourth area 204 on the bottom right side. The controller (not illustrated) may set the first and the second dividing lines 211 and 212 to divide a screen into a left portion and a right portion, and may set the third and fourth dividing lines 213 and 214 to divide the screen into an upper portion and a lower portion.

The controller (not illustrated) may display a center button 220 at an intersection of the first and second dividing lines 211 and 212 and the third and fourth dividing lines 213 and 214. Although FIGS. 2A through 2I illustrate that the center button 220 is in a quadrangular shape, this is merely an example, and the present disclosure may include a polygonal shape, a circular shape, and an oval shape, in addition to the quadrangular shape. The center button may be a function key for changing a size of an application display space or for entering a window location change mode.

The controller (not illustrated) may execute a control to dispose windows that execute applications respectively, one for each area 201 to 204. Alternatively, the controller (not illustrated) may execute at least one application in each or all of the areas 201 to 204. For example, the controller (not illustrated) may execute a control to display a window on each area 201 to 204, as illustrated in FIGS. 2B to 2K.

The window may be an area including an execution screen of a predetermined application, a title bar for the executed application, and a control area. Objects related to the application may be displayed on the execution screen of the application. The objects may be formed in various shapes such as text, a figure, an icon, a button, a check box, a picture, a video, a web, a map and the like. When the user touches the object, a function or event predetermined for the object may be performed in a corresponding application. The object may be called a view according to an operating system. The title bar may include at least one control key for controlling a display of the window. For example, the control key may be a window display minimizing button, a window display maximizing button, or a window ending button.

Meanwhile, applications are programs independently implemented by a manufacturer of the display device 200 or an application developer. Accordingly, pre-execution of one application is not required to execute another application. Further, although one application ends, another application can be continuously executed.

The applications are distinguished from a complex function application (or dual application) generated by adding some functions (memo function and message transmission/reception function) provided by another application to functions of one application, in that the applications are independently implemented programs. However, the complex function application is a single application newly produced to have various functions and thus has differences from related-art applications. Accordingly, unlike the related-art applications, the complex function application provides only limited functions, instead of providing various functions. Further, users have a burden of separately having to purchase such a new complex function application.

Figure 2B:
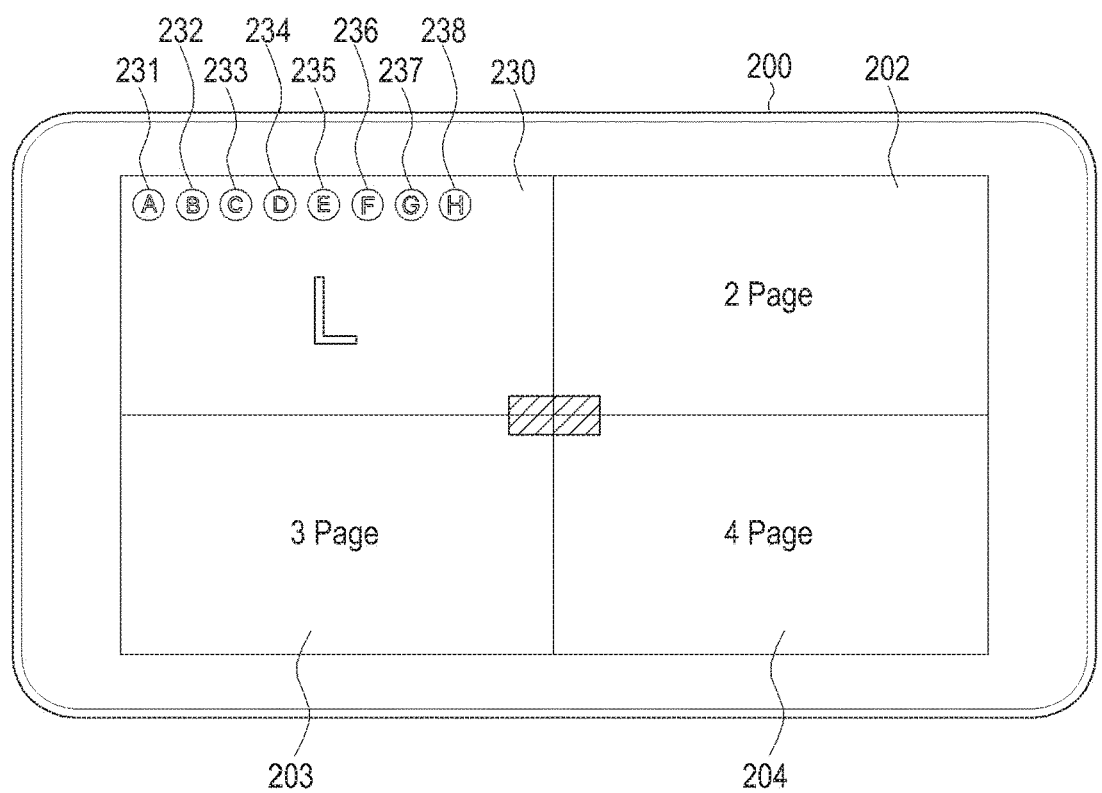

Referring to FIG. 2B, the controller (not illustrated) may execute a control to display a window 230 that executes a launcher application, on the first area 201. The launcher application displays executable application icons 231 to 238, as illustrated in FIG. 2B. When an application execution command is input by touching one of the application icons 231 to 238, the launcher application displays an application corresponding to the touched icon on one of the first area 201 to the fourth area 204, which are window display spaces.

Figure 3A:
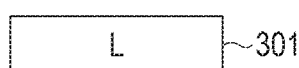
FIGS. 3A, 3B, 3C, 3D, 3E, 3F, 3G, 3H, and 3I are conceptual diagrams illustrating an activity stack according to various embodiments of the present disclosure.

FIG. 3A is a conceptual diagram illustrating an activity stack that is managed by a display device. The controller (not illustrated) may generate and manage a launcher application activity stack 301 in an activity stack, in response to the execution of the launcher application.

Figure 2C:
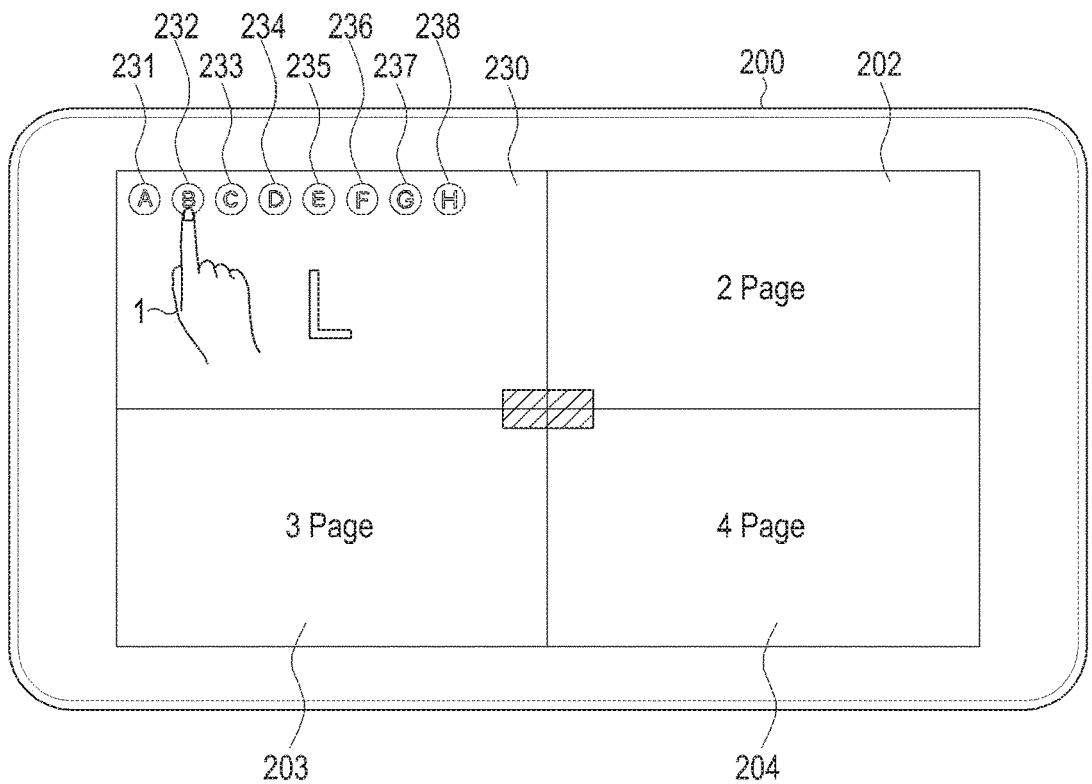
Figure 2D:
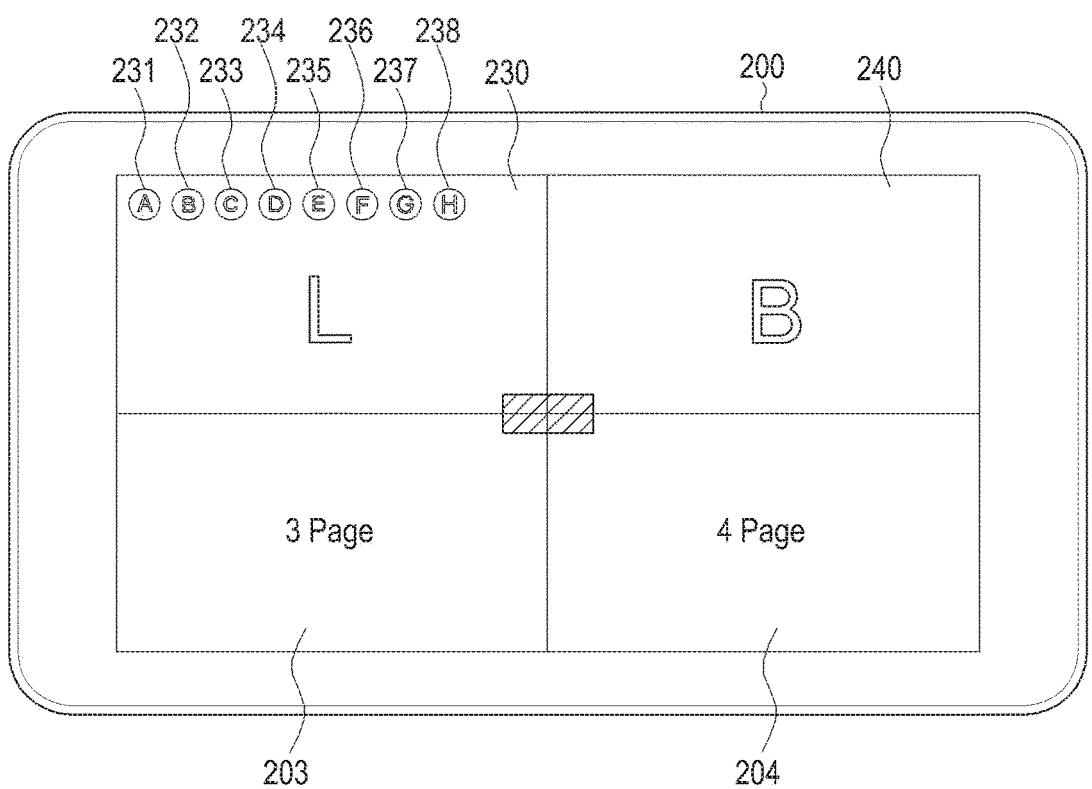

Referring to FIG. 2C, a user 1 may touch an icon corresponding to application B. When the icon corresponding to application B is touched, the controller (not illustrated) may execute a control to display a second window 240 that executes application B on the second area, as illustrated in FIG. 2D. The controller (not illustrated) may determine a window display space where a window is displayed, in a predetermined order. For example, the controller (not illustrated) may execute a control to display new windows clockwise, in an order from the second area, to the fourth area, and to the third area. The mentioned order is merely an example, and the controller (not illustrated) may execute a control to display new windows counterclockwise. An order of displaying new windows in window display spaces may be changeable.

Figure 3B:
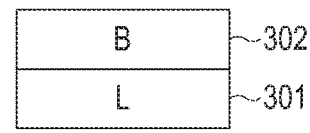

FIG. 3B is a conceptual diagram of an activity stack corresponding to FIG. 2D. The controller (not illustrated) may generate an application B activity stack 302 in the activity stack, in response to the execution of application B. The controller (not illustrated) may dispose the application B activity stack 302 of application B which is the latest executed application, on the launcher application activity stack 301. This means that a rank of the application B activity stack 302 is higher than a rank of the launcher application activity stack 301.

Figure 2E:
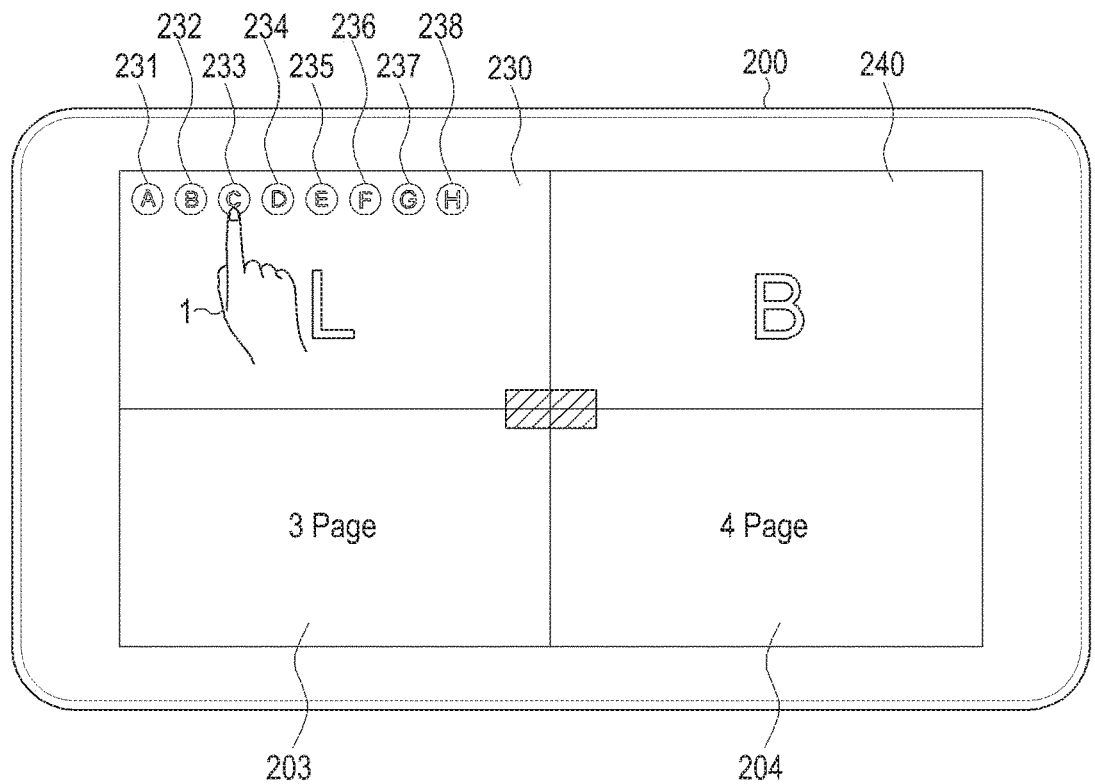
Figure 3C:
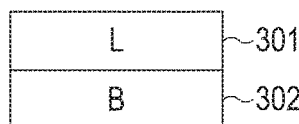

Referring to FIG. 2E, the user 1 may touch an icon 233 corresponding to application C. FIG. 3C is a conceptual diagram of an activity stack corresponding to FIG. 2E. As illustrated in FIG. 2E, since the user inputs an application execution command to the launcher application, it is recognized that the rank of the launcher application activity stack 301 is higher than the rank of the application B activity stack 302.

Figure 2F:
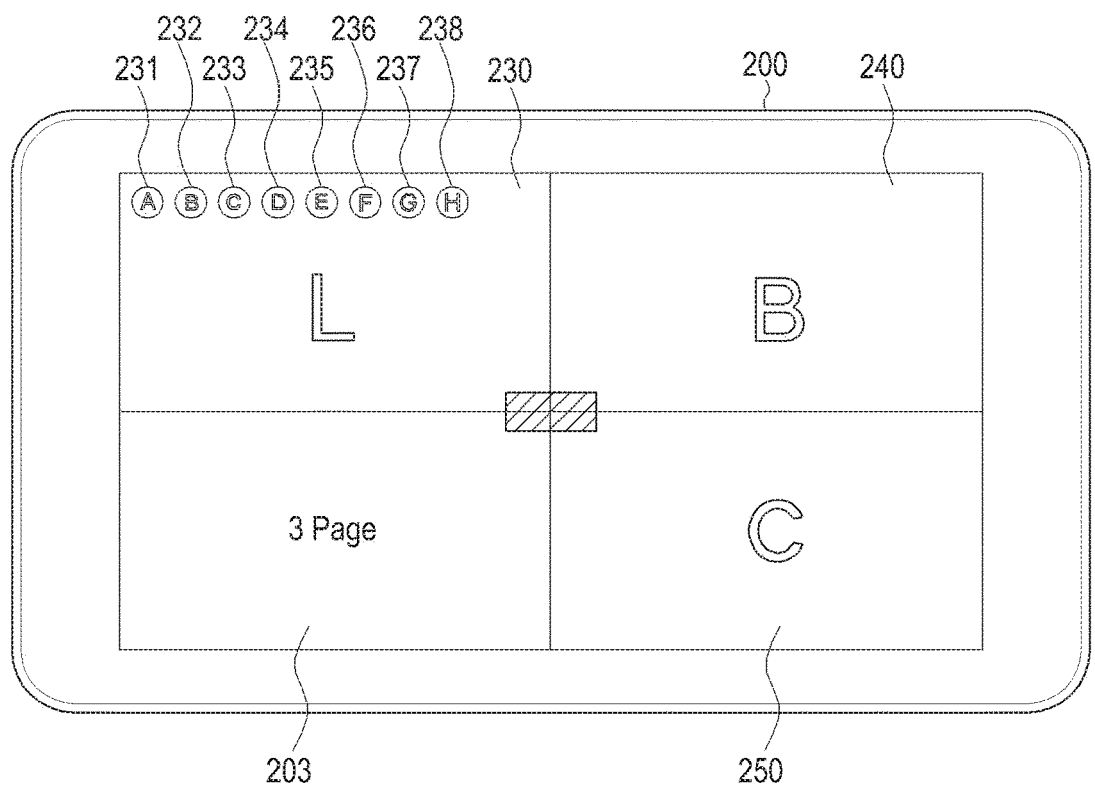

When the icon 233 corresponding to application C is touched, the controller (not illustrated) may execute a control to display a third window 250 that executes application C on the fourth area, as illustrated in FIG. 2F.

Figure 3D:
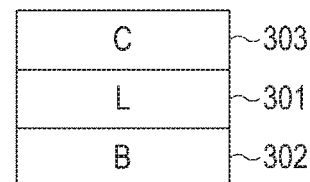

FIG. 3D is a conceptual diagram of an activity stack corresponding to FIG. 2F. The controller (not illustrated) may generate an application C activity stack 303 in the activity stack, in response to the execution of application C. The controller (not illustrated) may dispose the application C activity stack 303 of application C which is the latest executed application, on the launcher application activity stack 301. This means that a rank of the application C activity stack 303 is higher than the rank of the launcher application activity stack 301.

Figure 2G:
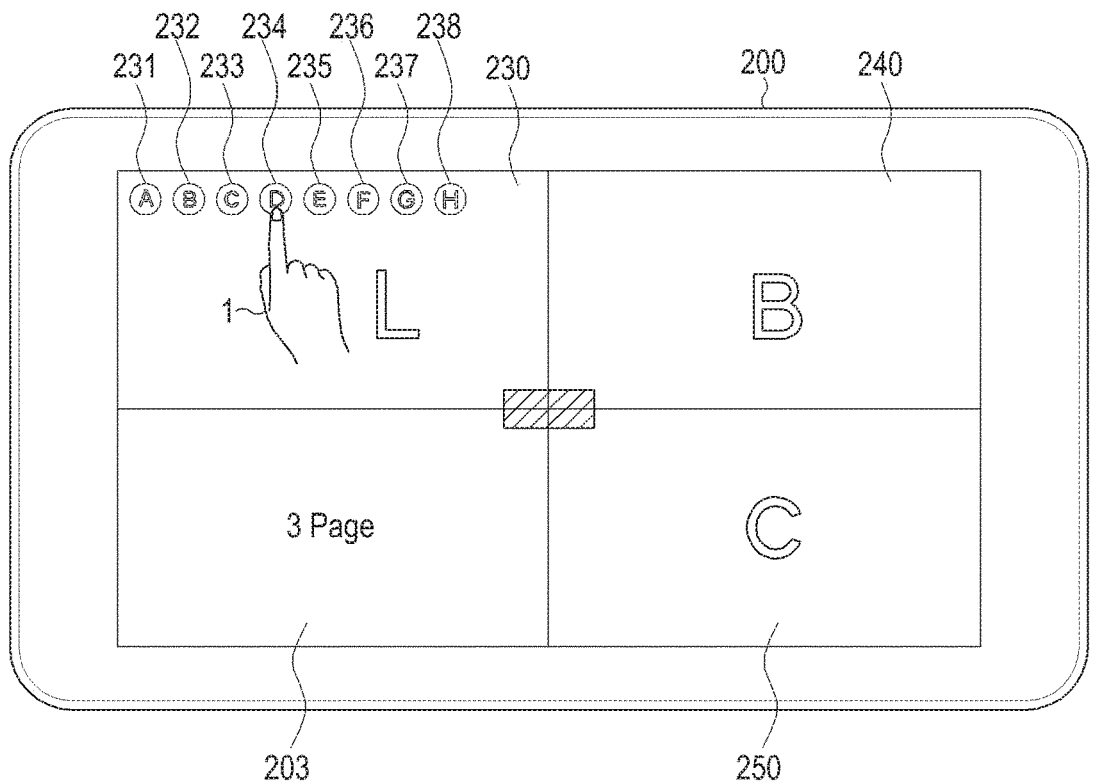
Figure 3E:
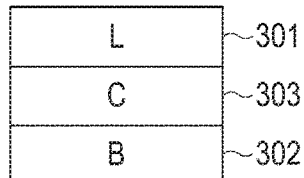

Referring to FIG. 2G, the user 1 may touch an icon 234 corresponding to application D. FIG. 3E is a conceptual diagram of an activity stack corresponding to FIG. 2G. As illustrated in FIG. 2G, since the user inputs an application execution command to the launcher application, it is recognized that the rank of the launcher application activity stack 301 is higher than the rank of the application C activity stack 303.

Figure 2H:
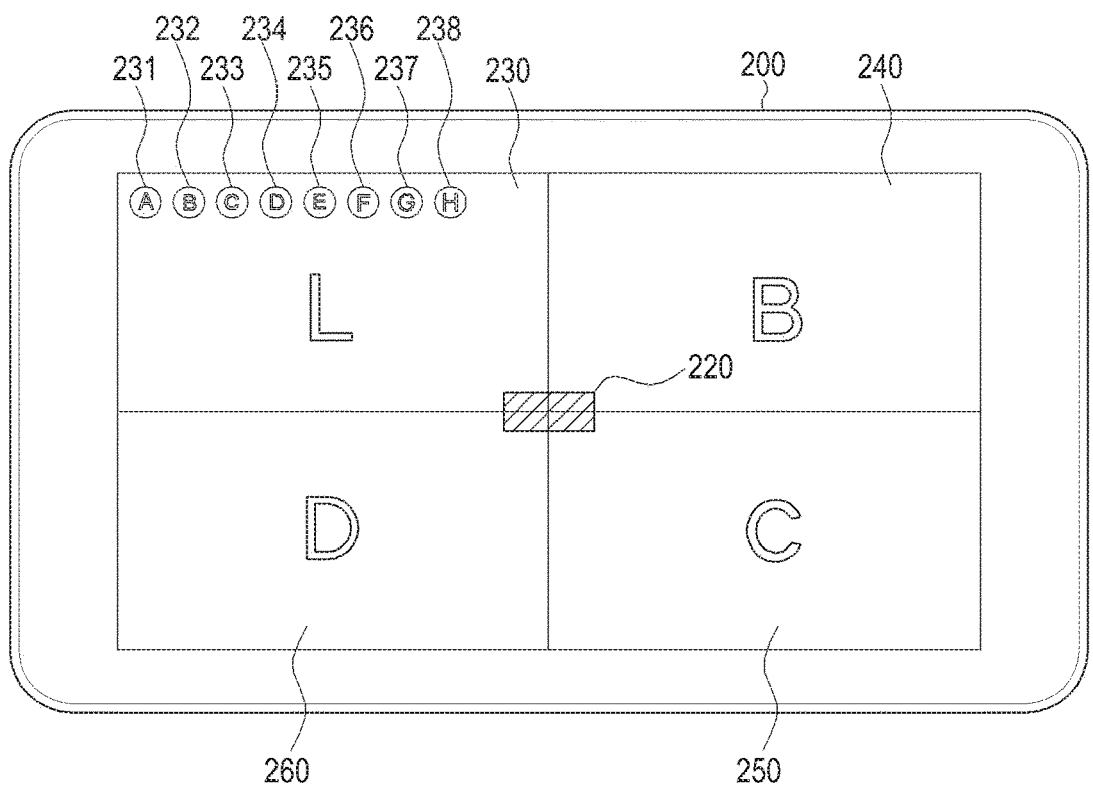

When an icon 234 corresponding to application D is touched, the controller (not illustrated) may execute a control to display a fourth window 260 that executes application D on the third area, as illustrated in FIG. 2H.

Figure 3F:
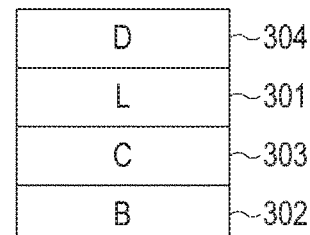

FIG. 3F is a conceptual diagram of an activity stack corresponding to FIG. 2H. The controller (not illustrated) may generate an application D activity stack 304 in the activity stack, in response to the execution of application D. The controller (not illustrated) may dispose the application D activity stack 304 of application D which is the latest executed application, on the launcher application activity stack 301. This means that a rank of the application D activity stack 304 is higher than the rank of the launcher application activity stack 301.

Figure 2I:
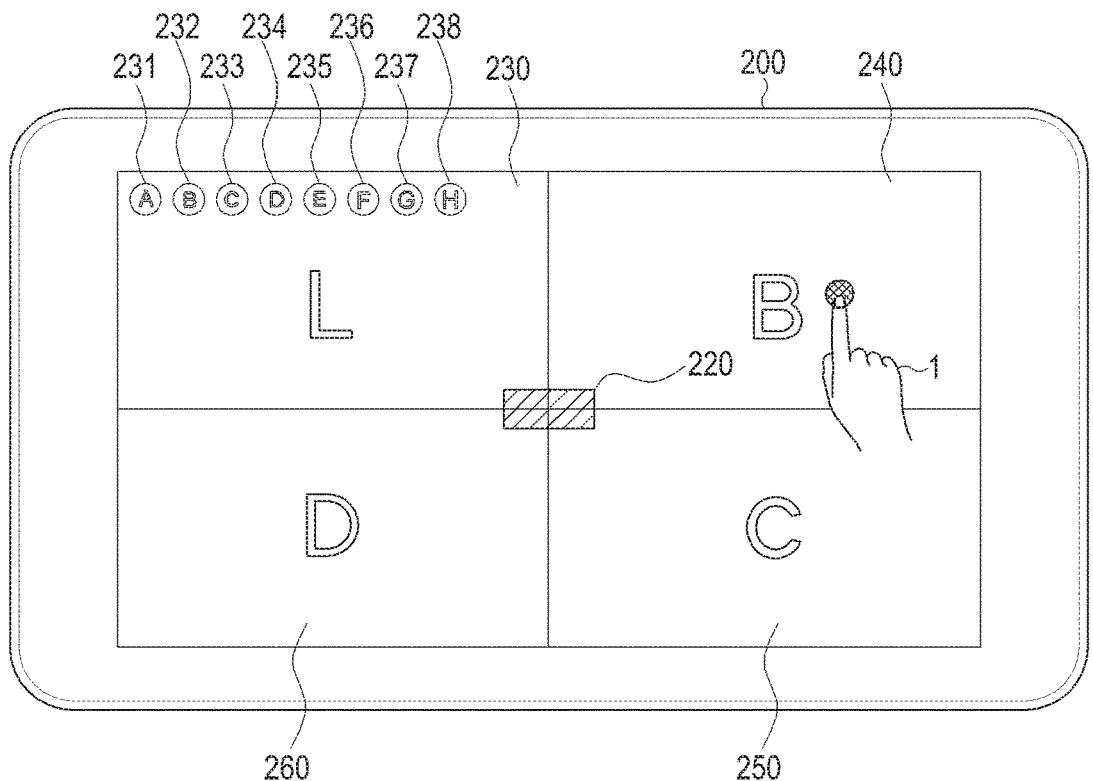
Figure 3G:
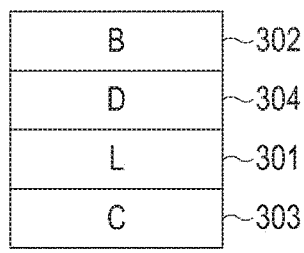

The user 1 may manipulate application B, as illustrated in FIG. 2I. FIG. 3G is a conceptual diagram of an activity stack corresponding to FIG. 2I. The controller (not illustrated) may dispose the application B activity stack 302 of application B which is the latest executed application on the top, in response to a user input on application B.

Figure 2J:
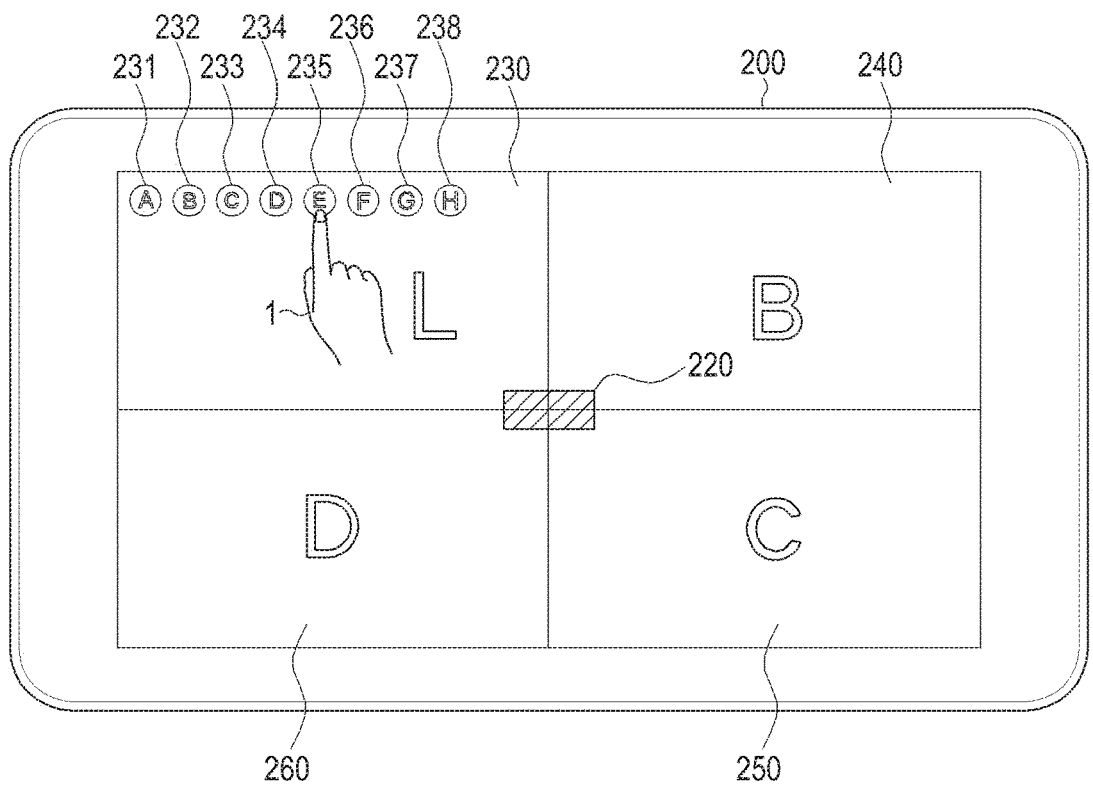

Referring to FIG. 2J, the user 1 may touch an icon 235 corresponding to application E. FIG. 3H is a conceptual diagram of an activity stack corresponding to FIG. 2K. As illustrated in FIG. 2J, since the user inputs an application execution command to the launcher application, it is recognized that the rank of the launcher application activity stack 301 is higher than the rank of the application D activity stack 304.

Figure 2K:
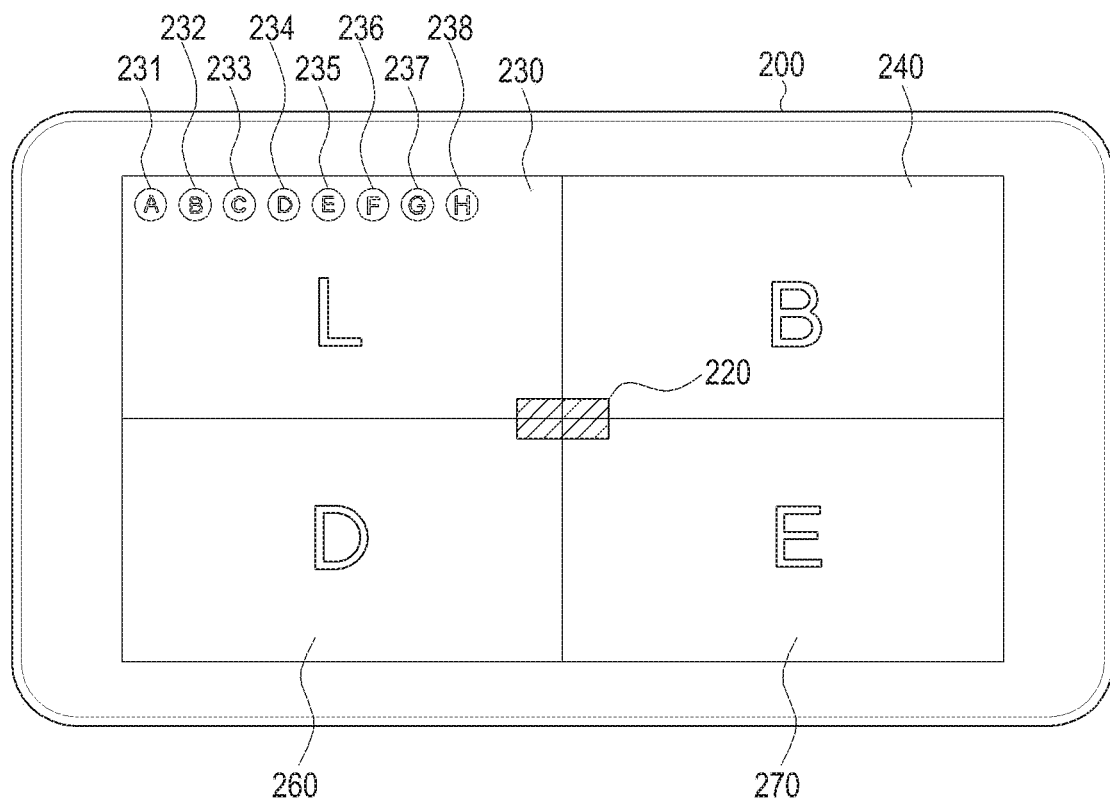
Figure 3H:
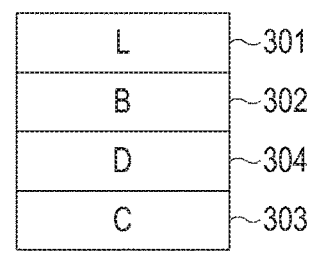

When an icon 235 corresponding to application E is touched, the controller (not illustrated) may execute a control to display a fifth window 270 that executes application D on the fourth area, as illustrated in FIG. 2K. When an empty window display space does not exist, the controller (not illustrated) may refer to the activity stack of FIG. 3H. The controller (not illustrated) may determine an application having the lowest activity stack rank among activity stacks. For example, in FIG. 3H, the controller (not illustrated) may determine that the rank of application C activity stack is lowest. The controller (not illustrated) may execute a control to display the fifth window 270 that executes application E on the fourth area 250 that displays application C that has the lowest activity stack rank.

Figure 3I:
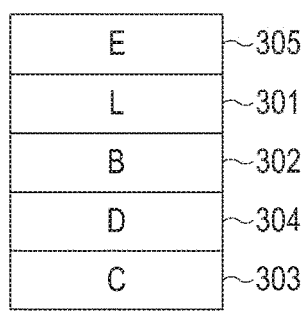

FIG. 3I is a conceptual diagram of an activity stack corresponding to FIG. 2K. The controller (not illustrated) may generate an application E activity stack 305 in the activity stack, in response to the execution of application E. The controller (not illustrated) may dispose the application E activity stack 305 of application E which is the latest executed application, on the launcher application activity stack 301. This means that a rank of the application E activity stack 305 is higher than the rank of the launcher application activity stack 301.

Figure 4:
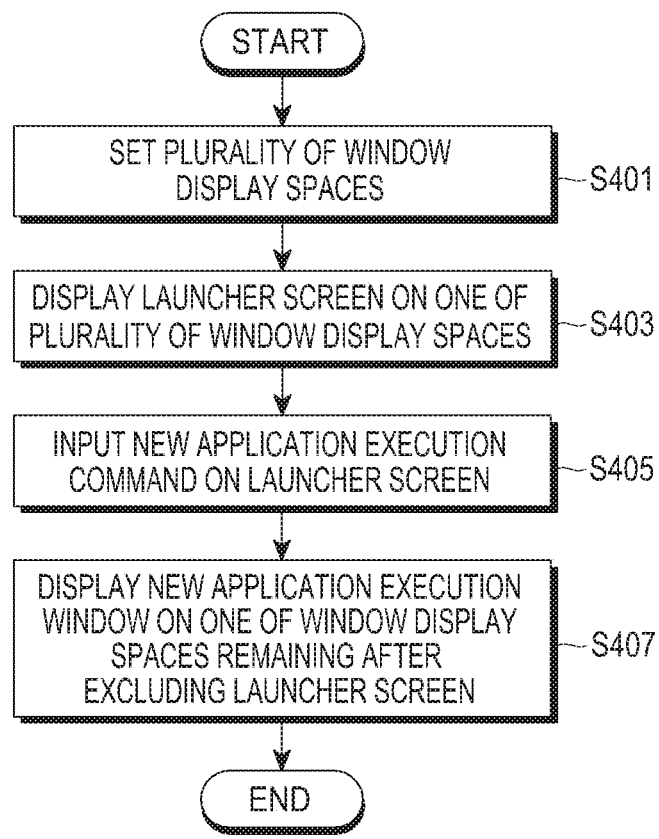
FIG. 4 is a flowchart illustrating a method of controlling a display device according to an embodiment of the present disclosure.

FIG. 4 is a flowchart illustrating a method of controlling a display device according to an embodiment of the present disclosure.

The display device may set, for example, a plurality of window display spaces, as shown in FIG. 2A, in operation S401. The display device may execute a launcher application that may execute a new application, on one of the plurality of window display spaces, in operation S403. Particularly, the display device may display a window that executes the launcher application, on one of the plurality of window display spaces.

The display device may receive an input of a new application execution command in the window that executes the launcher application, in operation S405. For example, the display device may receive an input of a new application execution command through touching an icon corresponding to an application, as shown in FIG. 2C.

The display device may display a window that executes a new application, in one of window display spaces remaining after excluding the application display space where the launcher application is executed, in operation S407.

FIGS. 5A through 5G are conceptual diagrams illustrating changing a size of a window according to another embodiment of the present disclosure.

Figure 5A:
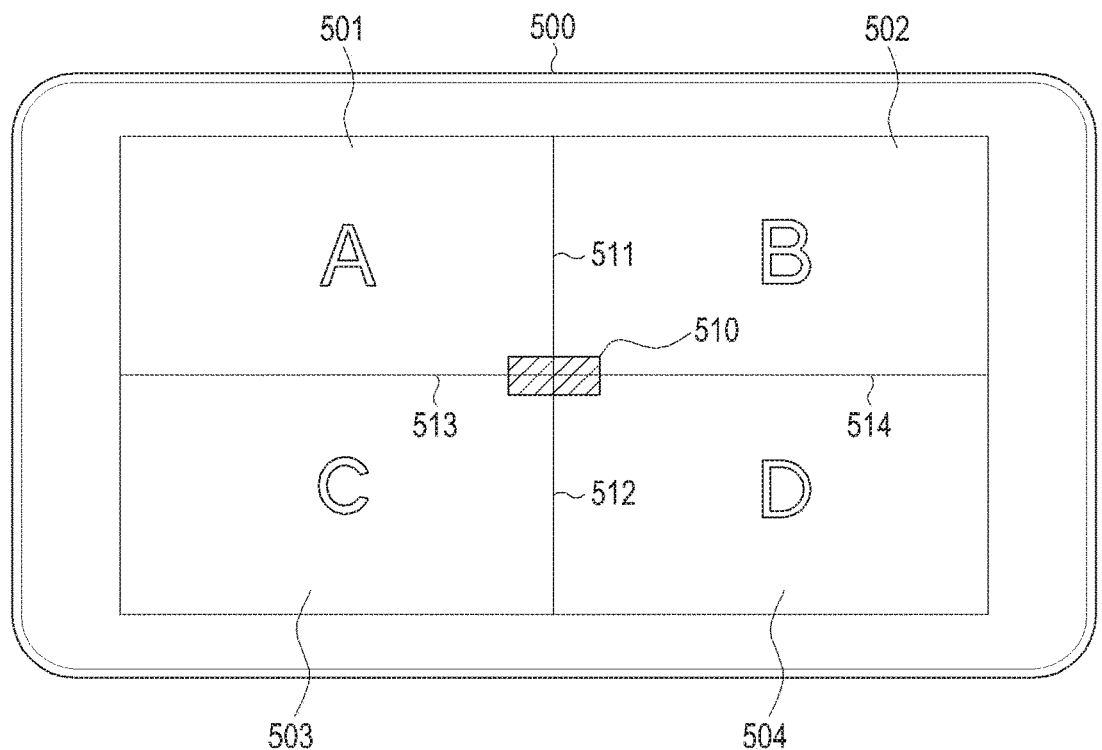
FIGS. 5A, 5B, 5C, 5D, 5E, 5F, and 5G are conceptual diagrams illustrating changing a size of a window according to another embodiment of the present disclosure.

FIG. 5A is a conceptual diagram of a display device according to an embodiment of the present disclosure, and the display device divides a touch screen into four areas, and displays different windows in the areas, respectively. A controller (not illustrated) of a display device 500 may set a layout that divides a screen into four parts. Particularly, the controller (not illustrated) may set a first area 501, a second area 502, a third area 503, and a fourth area 504. The controller (not illustrated) may set a first dividing line 511 that distinguishes the first area 501 and the second area 502, a second dividing line 512 that distinguishes the third area 503 and the fourth area 504, a third dividing line 513 that distinguishes the first area 501 and the third area 503, and a fourth dividing line 514 that distinguishes the second area 502 and the fourth area 504.

The controller (not illustrated) may execute a control to dispose windows that execute applications respectively, one for each area 501 to 504. For example, the controller (not illustrated) may execute a control to display a first window that executes application A on the first area 501, to display a second window that executes application B on the second area 502, to display a third window that executes application C on the third area 503, and to display a fourth window that executes application D on the fourth area 504.

Alternatively, the controller (not illustrated) may execute at least one application in each or all of the areas 501 to 501.

The controller (not illustrated) may display a center button 510 at an intersection of the first and second dividing lines 511 and 512 and the third and fourth dividing lines 513 and 514. Although FIGS. 5A through 5G illustrate that the center button 510 is in a quadrangular shape, this is merely an example, and the present disclosure may include a polygonal shape, a circular shape, and an oval shape, in addition to the quadrangular shape.

Figure 5B:
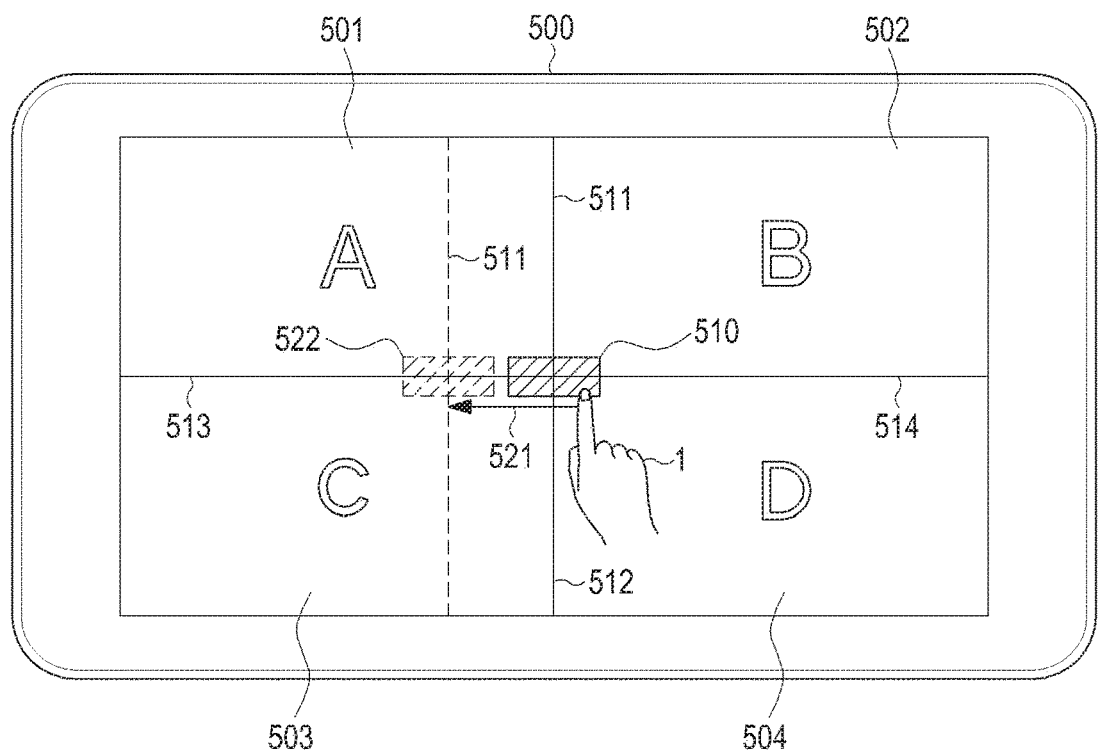
Figure 5C:
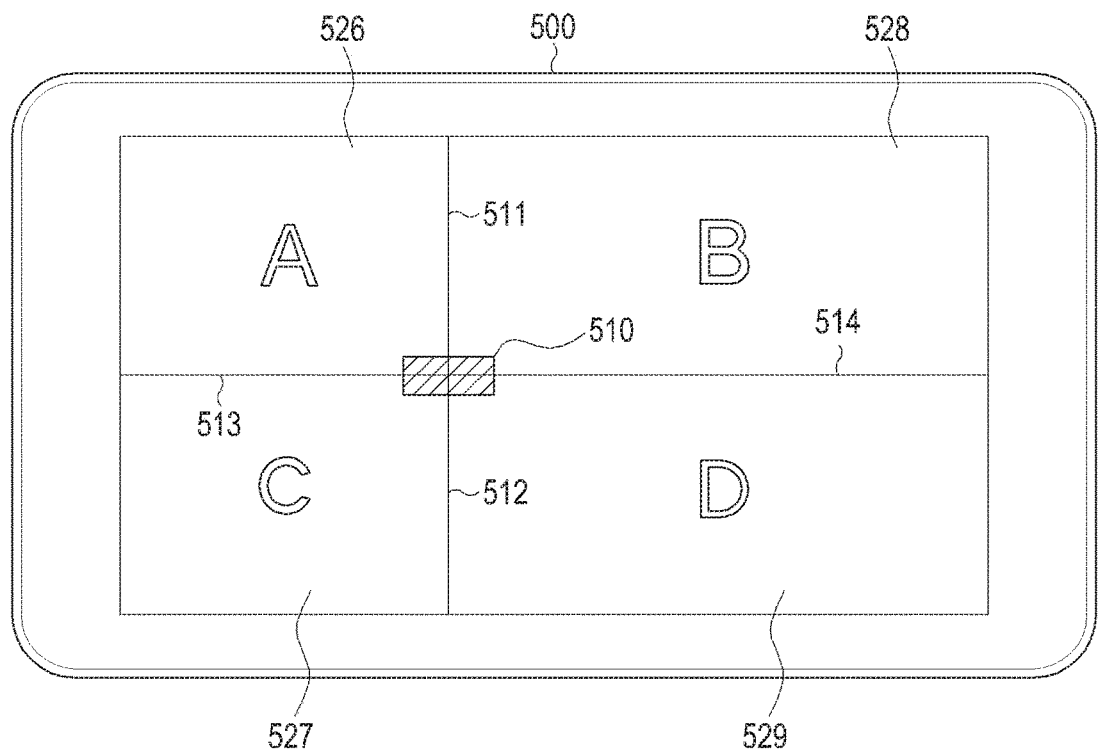

As illustrated in FIG. 5B, the user 1 may input a first gesture starting from the center button 510 and ending at a first ending point 522 (for example, a leftward drag gesture 521 or a gesture 521 provided in a direction that is far from the second area and the fourth area), as a window size change command. The controller (not illustrated) may execute a control to change a location of the center button 510 to the first ending point 522 and to display the same, as shown in FIG. 5C. Additionally, the controller (not illustrated) may execute a control to reset dividing lines 511 to 514 based on the center button 510, and display the same. For example, the controller (not illustrated) may reset the first dividing line 511 in the upward direction from the center button 510, may set the second dividing line 512 in the downward direction from the center button 510, may set the third dividing line 513 to the left from the center button 510, and may set the fourth dividing line 514 to the right from the center button 510. In addition, the controller (not illustrated) may execute a control to change sizes of the first area to the fourth area 526 to 529 based on the reset dividing lines 511 to 514, and to display the same. That is, in the embodiment of FIG. 5B, the sizes of all the window display areas may be changed together, unlike FIG. 2C.

Figure 5D:
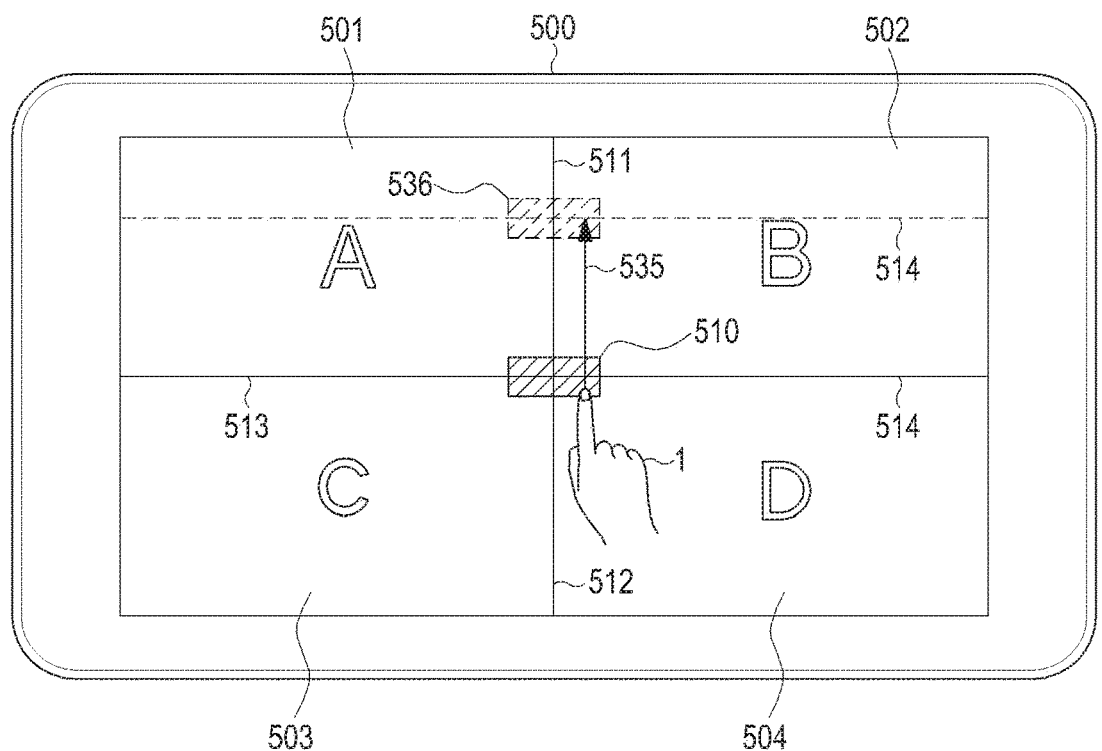
Figure 5E:
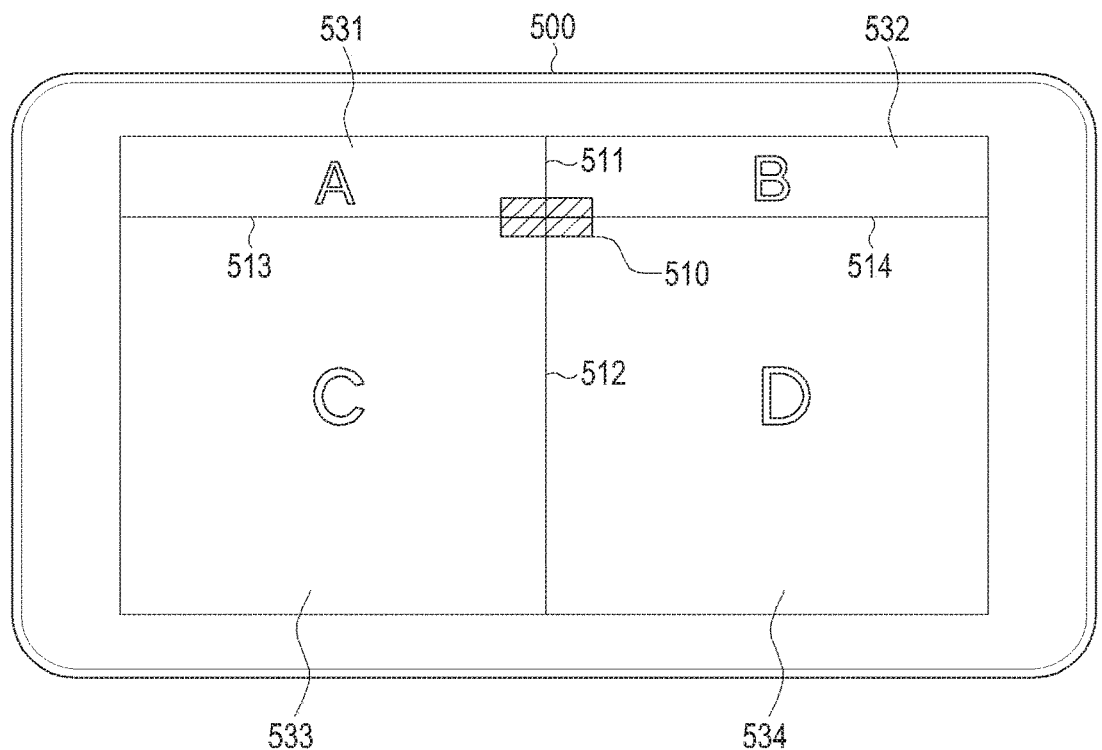

FIG. 5D is a conceptual diagram illustrating a method of changing a window size according to another embodiment of the present disclosure. As illustrated in FIG. 5D, a user may input a second gesture starting from the center button 510 and ending at a second ending point 536 (for example, an upward drag gesture 535 or a gesture 535 provided in a direction that is far from the third area 503 and the fourth area 504), as a window size change command. The controller (not illustrated) may execute a control to change a location of the center button 510 to the second ending point 536 and to display the same, as shown in FIG. 5E. In addition, the controller (not illustrated) may execute a control to reset the dividing lines 511 to 514 based on the center button 510, and display the same. The controller (not illustrated) may execute a control to change sizes of the first area to the fourth area 531 to 534 based on the reset dividing lines 511 to 514, and to display the same.

Figure 5F:
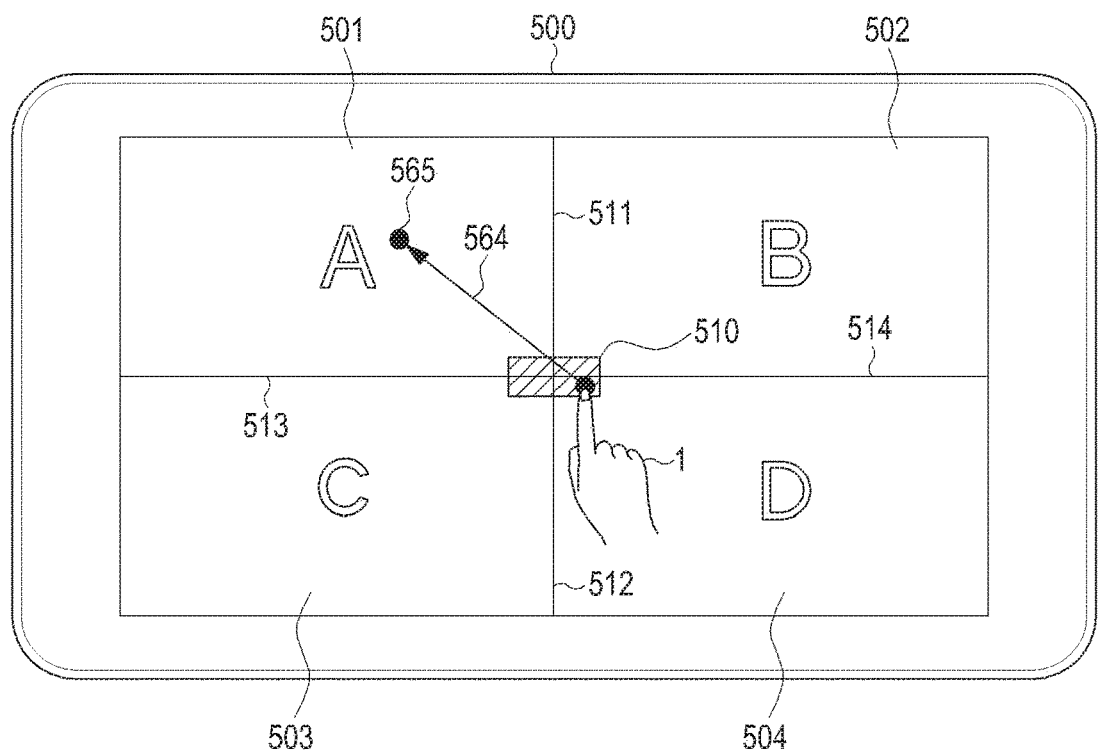
Figure 5G:
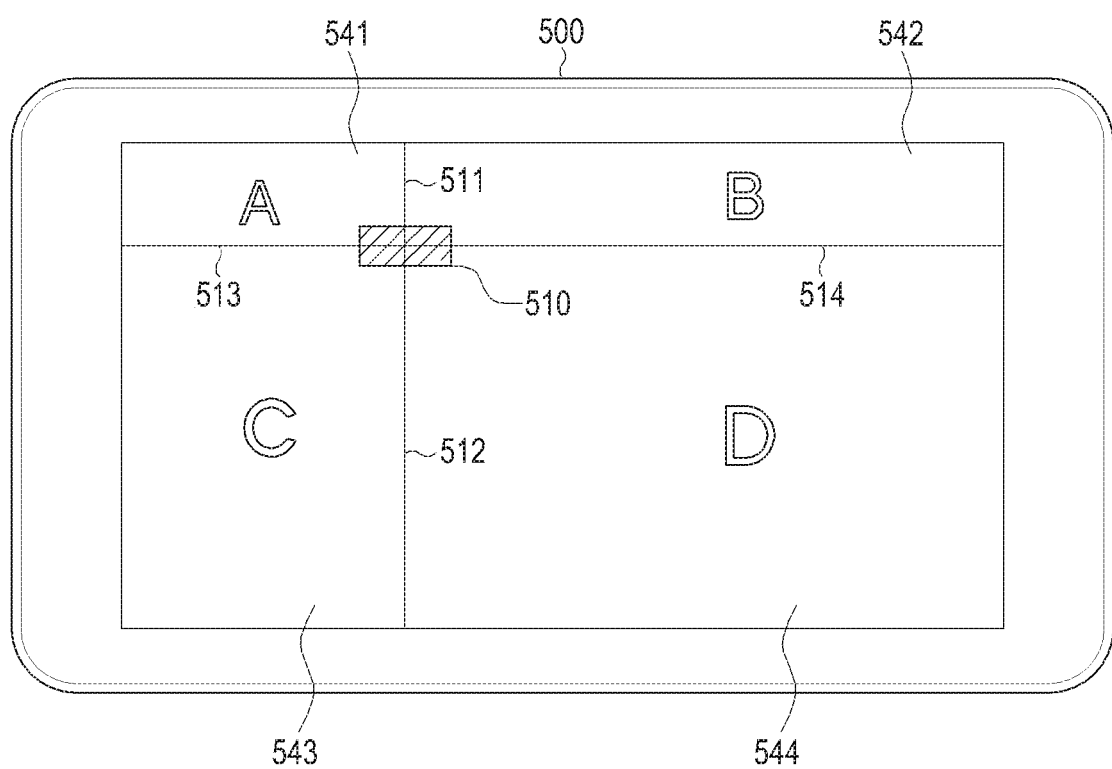

FIG. 5F is a conceptual diagram illustrating a method of changing a window size according to another embodiment of the present disclosure. As illustrated in FIG. 5F, a user may input a third gesture starting from the center button 510 and ending at a third ending point 565 (for example, a top-left drag gesture 564 or a gesture 564 provided in a direction that is far from the fourth area 504), as a window size change command. The controller (not illustrated) may execute a control to change a location of the center button 510 to the third ending point 565 and to display the same, as shown in FIG. 5G. In addition, the controller (not illustrated) may execute a control to reset the dividing lines 511 to 514 based on the center button 510, and display the same. The controller (not illustrated) may execute a control to change sizes of the first area to the fourth area 541 to 544 based on the reset dividing lines 511 to 514, and to display the same. Additionally, when the center button 510 is moved in a direction that is far from a point where the forth area 504 is located (for example, the third gesture), the size of the fourth area is displayed by being enlarged and the size of the first area 501 is displayed by being reduced. A ratio used for reducing the first area may be identical to a ratio used for enlarging the fourth area.

Figure 6:
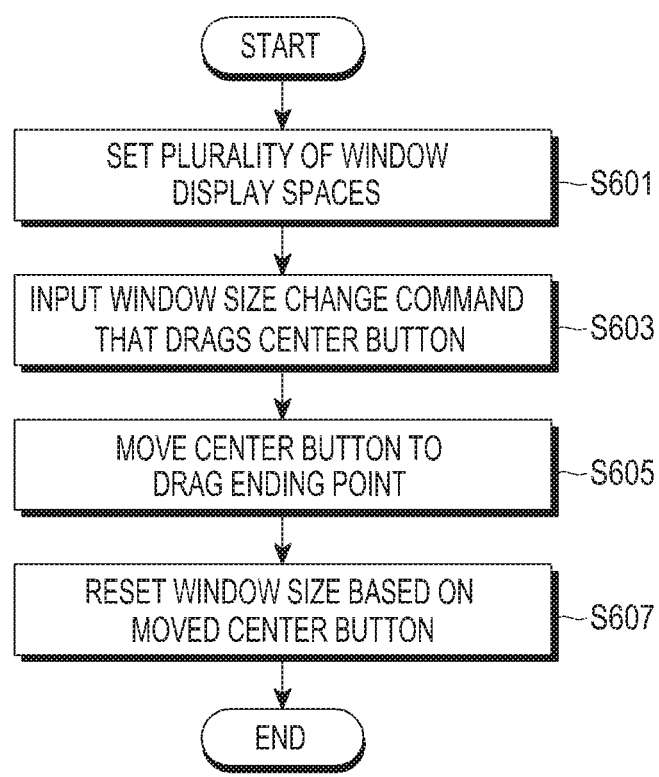
FIG. 6 is a flowchart illustrating a method of changing a size of a window according to an embodiment of the present disclosure.

FIG. 6 is a flowchart illustrating a method of changing a size of a window according to an embodiment of the present disclosure.

A display device may set a plurality of window display spaces, for example, the first area to the fourth area of FIG. 5A, and may display a plurality of windows, in operation S601. The display device may set, for example, at least one dividing line, and may set a plurality of window display spaces. Here, a center button may be formed at an intersection of at least one dividing line.

When a plurality of window display spaces is set, the display device may receive an input of a window size change command that drags the center button, in operation S603. The display device may reset dividing lines based on the moved center button, after moving the center button to a drag ending point, in operation S605. The display device may reset a window size based on the at least one reset dividing line, in operation S607.

FIGS. 7A through 7E are conceptual diagrams illustrating a display device according to an embodiment of the present disclosure.

Figure 7A:
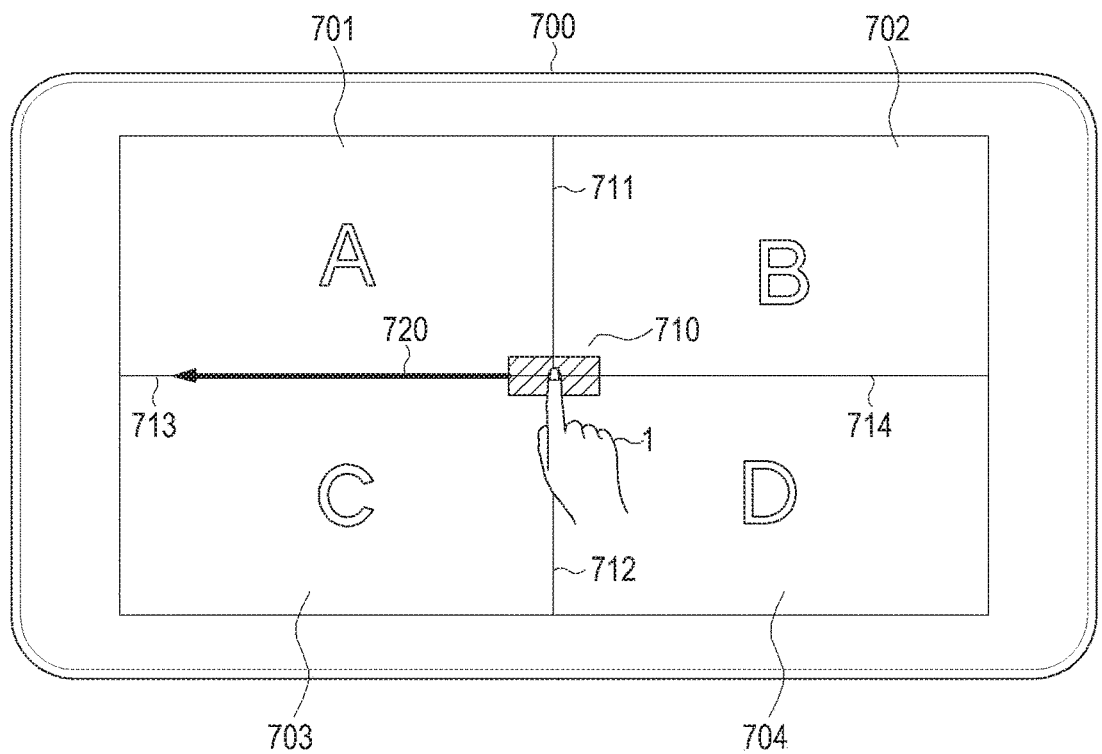
FIGS. 7A, 7B, 7C, 7D, and 7E are conceptual diagrams illustrating a display device according to an embodiment of the present disclosure.

As illustrated in FIG. 7A, a display device 700 may deploy a first window 701 to a fourth window 704 in the first area to the fourth area, and display the same. The display device 700 may display a first dividing line 711 to a fourth dividing line 714, and may display a center button 710 at an intersection of the first dividing line 711 to the fourth dividing line 714. Although FIGS. 7A through 7D illustrate that the center button 710 is in a quadrangular shape, this is merely an example, and the present disclosure may include a polygonal shape, a circular shape, and an oval shape, in addition to the quadrangular shape.

Figure 7B:
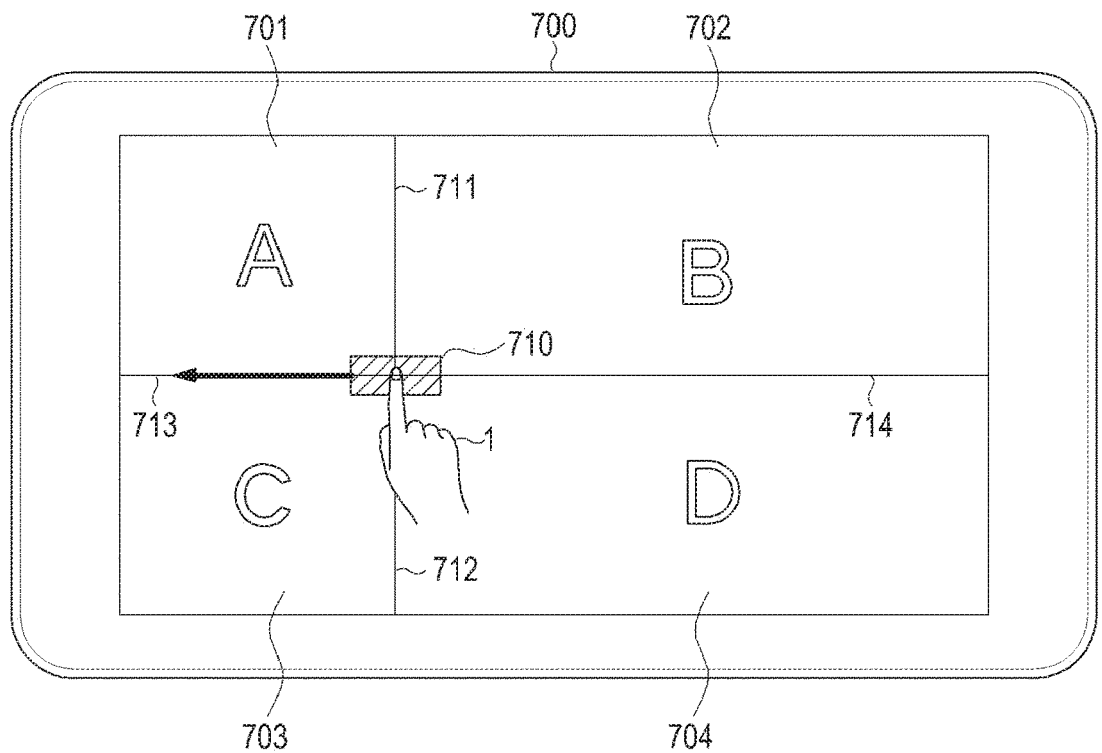

The user 1 may input a leftward drag gesture 720 starting from the center button 710. A controller (not illustrated), as illustrated in FIG. 7B, may execute a control to reduce the widths of the first window 701 and the third window 703, and simultaneously, to enlarge the widths of the second window 702 and the fourth window 704, and to display the same. The controller (not illustrated) may execute a control to move the center button 710 to a point where the drag gesture is made, and to display the same.

Figure 7C:
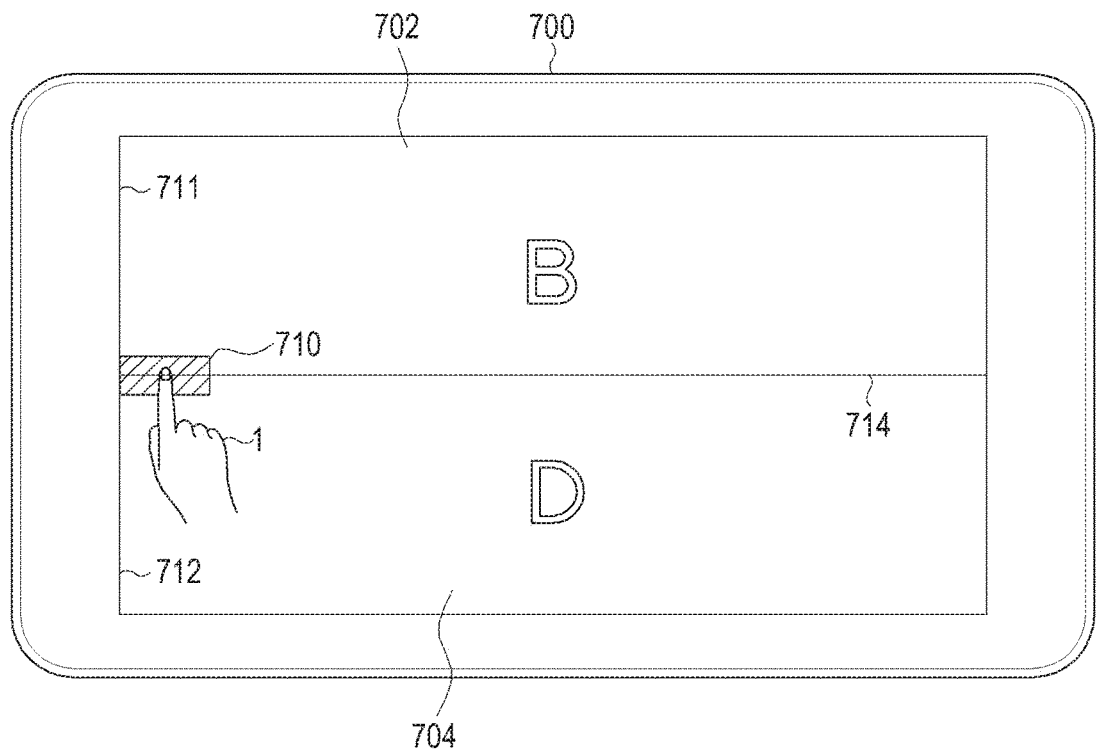

As illustrated in FIG. 7C, when the drag gesture arrives at a boundary line of the touch screen and the center button 710 arrives at the boundary line of the touch screen, the controller (not illustrate) may execute a control to discontinue display of the first window 701 and the third window 703. The controller (not illustrated) may execute a control to further enlarge the width of the second window 702, so as to display the second window 702 in the upper half of the touch screen. The controller (not illustrated) may execute a control to further enlarge the width of the fourth window 704, so as to display the fourth window 704 in the lower half of the touch screen. Additionally, the controller (not illustrated) may execute a control to display only the fourth dividing line 714 and to discontinue display of the remaining dividing lines.

Figure 7D:
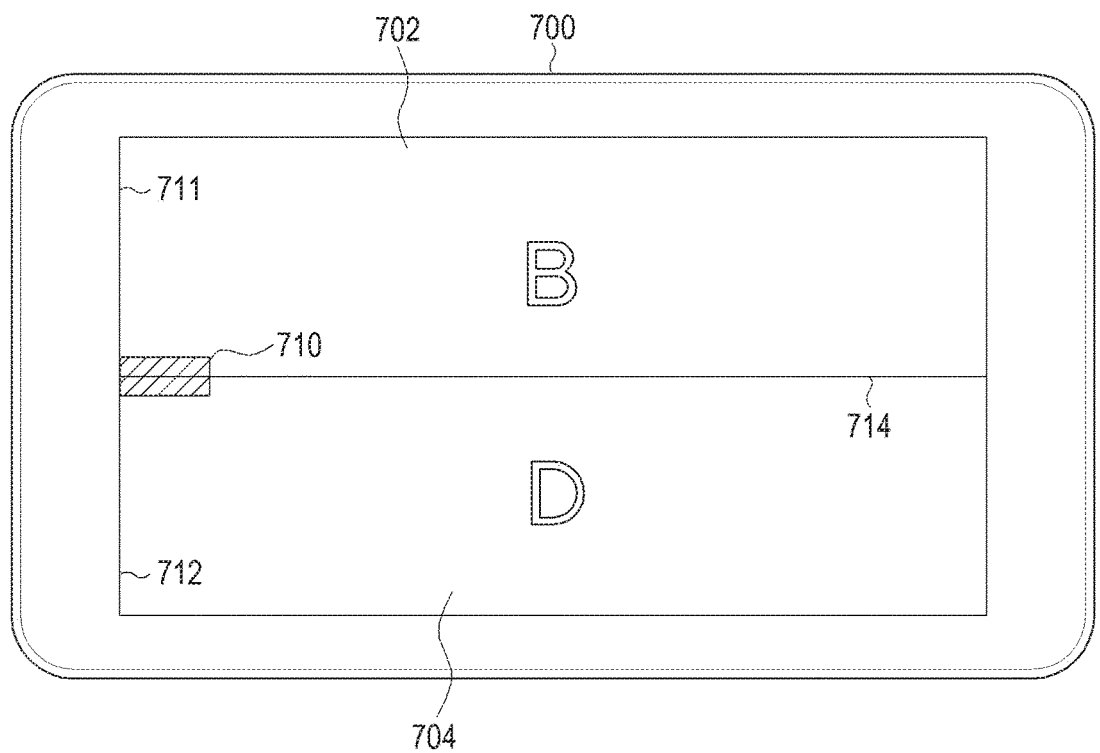
Figure 7E:
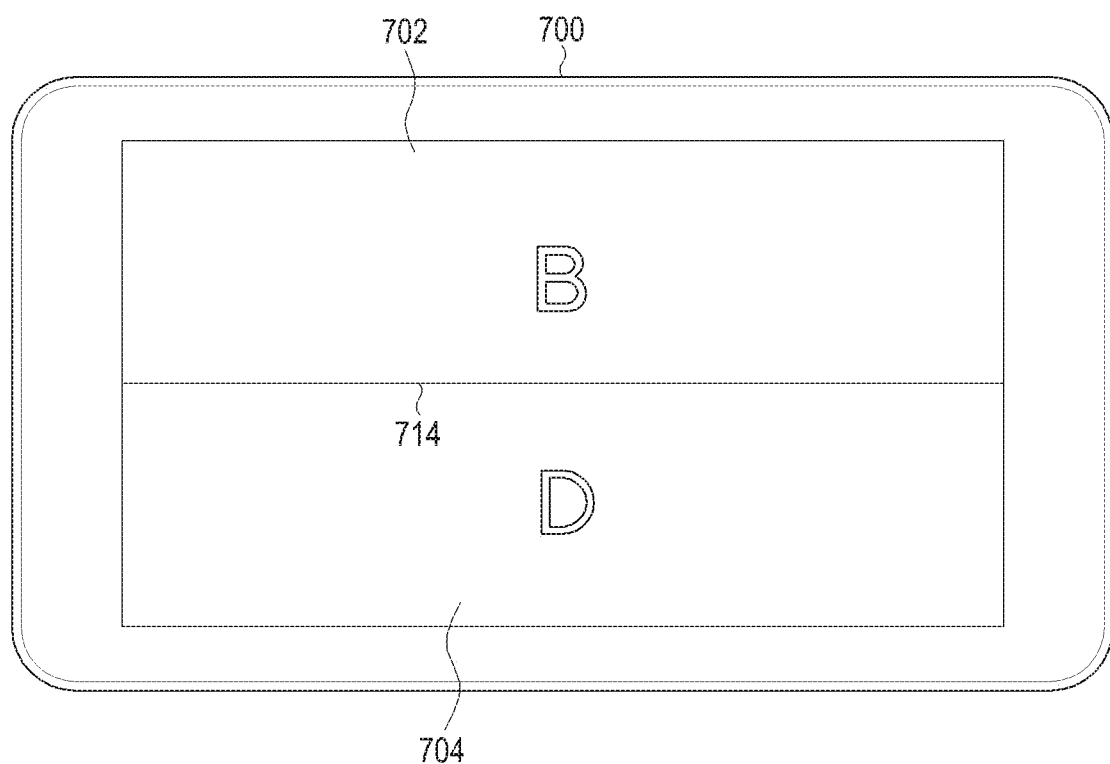

Referring to FIG. 7D, the user may terminate inputting a drag gesture. The controller (not illustrated) may determine that inputting a drag gesture is terminated based on the fact that a touch of the drag gesture is released. The controller (not illustrated) may execute a control to discontinue display of the center button 710, as illustrated in FIG. 7E. For example, the controller (not illustrated) may execute a control to discontinue display of the center button 710 after a predetermined period of time from the termination of inputting the drag gesture.

The controller (not illustrated) may execute a control to display the touch screen that is divided into an upper portion and a lower portion when the center button 710 is located in the left boundary line or the right boundary line of the touch screen, and to display the touch screen that is divided into a left portion and a right portion when the center button 710 is located in the upper side boundary line or the lower side boundary line. Particularly, the controller may execute a control to display the touch screen by dividing the same into an upper portion and a lower portion when the center button 710 is moved to the left boundary line of the touch screen by a leftward drag gesture, to display the touch screen by dividing the same into an upper portion and a lower portion when the center button 710 is moved to the right boundary line of the touch screen by a rightward drag gesture, to display the touch screen by dividing the same into a left portion and a right portion when the center button 710 is moved to the upper side boundary line of the touch screen by an upward drag gesture, and to display the touch screen by dividing the same into a left portion and a right portion when the center button 710 is moved to the lower side boundary line of the touch screen by a downward drag gesture.

Figure 8:
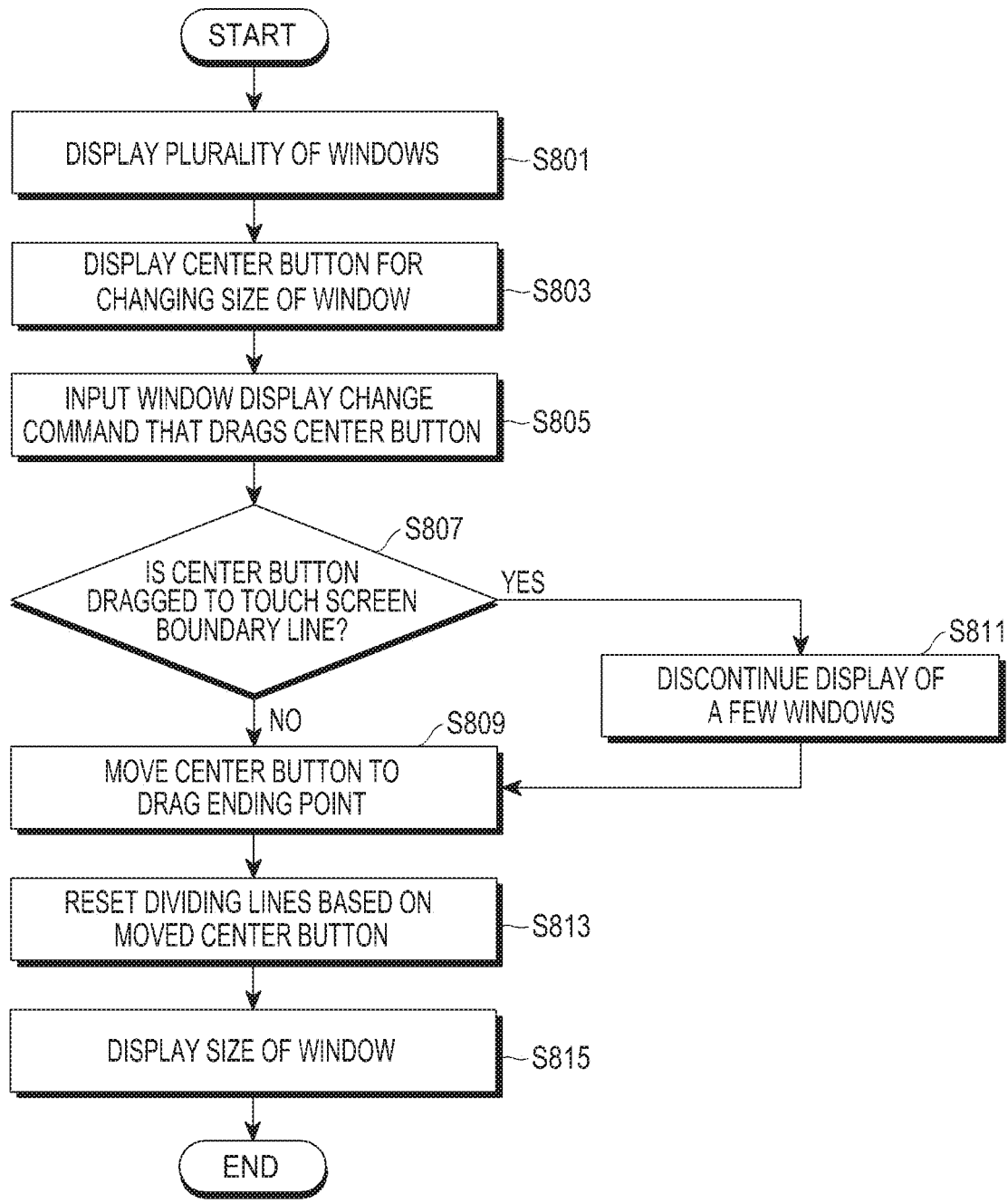
FIG. 8 is a flowchart illustrating a method of controlling a display device according to an embodiment of the present disclosure.

FIG. 8 is a flowchart illustrating a method of controlling a display device according to an embodiment of the present disclosure.

A display device displays a plurality of windows on a touch screen, in operation S801. In addition, the display device displays a center button for adjusting a window size, at an intersection of dividing lines for distinguishing the plurality of windows, in operation S803.

The display device receives a window size change command that drags the center button in operation S805. For example, the window size change command may be a drag gesture starting from the center button. The display device may execute a control to change sizes of windows based on the input window size change command, and to display the same.

The display device may determine whether the center button is dragged to a touch screen boundary line, in operation S807. When the drag gesture is input up to the touch screen boundary line in operation S807—Yes, the display device may execute a control to discontinue display of a few windows in operation S811. Particularly, the display device may execute a control to display other windows by enlarging the sizes of the windows, and accordingly, may control to display the few windows by reducing sizes of the windows.

When the drag gesture is not input up to the touch screen boundary line in operation S807—No, the display device may move the center button to an ending point of the drag gesture and may display the same in operation S809. The display device may move the center button in response to a touch point of the drag gesture, and may display the same.

The display device may reset the dividing lines based on the moved center button and display the same in operation S813, and accordingly, may change sizes of the windows and display the same in operation S815.

FIGS. 9A through 9D are conceptual diagrams illustrating a display device according to another embodiment of the present disclosure.

Figure 9A:
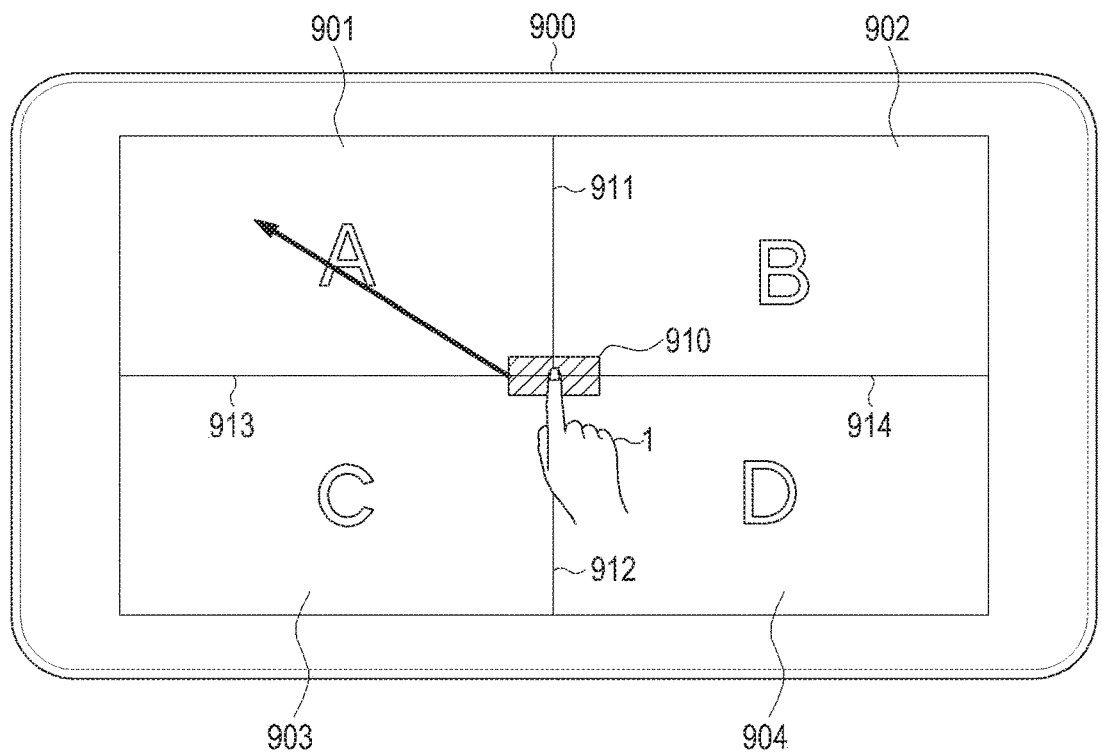
FIGS. 9A, 9B, 9C, and 9D are conceptual diagrams illustrating a display device according to another embodiment of the present disclosure.
Figure 9B:
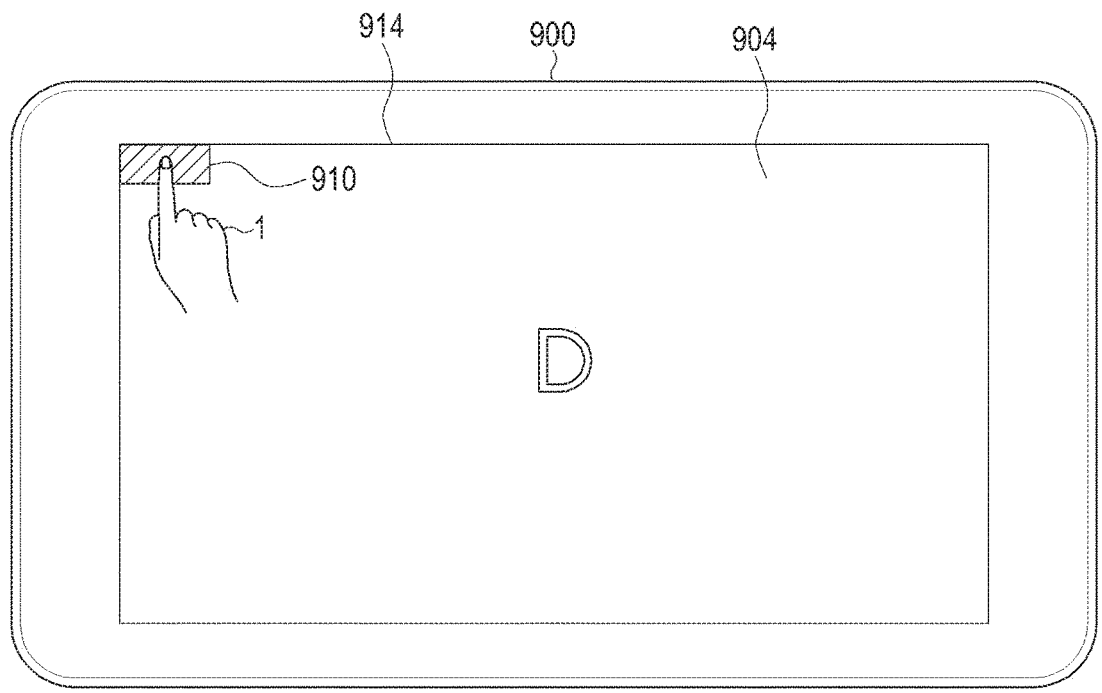

As illustrated in FIG. 9A, a display device 900 may deploy a first window 901 to a fourth window 904 on a first area to a fourth area, respectively, and display the same. The display device 900 may display a first dividing line 911 to a fourth dividing line 914, and may display a center button 910 at an intersection of the first dividing line 911 to the fourth dividing line 914. Although FIGS. 9A through 9C illustrate that the center button 910 is in a quadrangular shape, this is merely an example, and the present disclosure may include a polygonal shape, a circular shape, and an oval shape, in addition to the quadrangular shape.

The user 1 may input a top-left drag gesture starting from the center button 910. A controller (not illustrated), as illustrated in FIG. 9B, may execute a control to enlarge a width and a height of the fourth window 904, and may display the same. When the center button 910 is moved to an edge of a touch screen, the controller (not illustrated) may display the fourth area 904 in a full screen. The fourth area 904 may be a window that is the farthest from the edge among a plurality of windows displayed on the touch screen. The remaining areas (first through third areas) excluding the fourth area 904 may not be displayed. The controller (not illustrated) may execute a control to move the center button 910 to a point where the drag gesture is made, and to display the same.

Figure 9C:
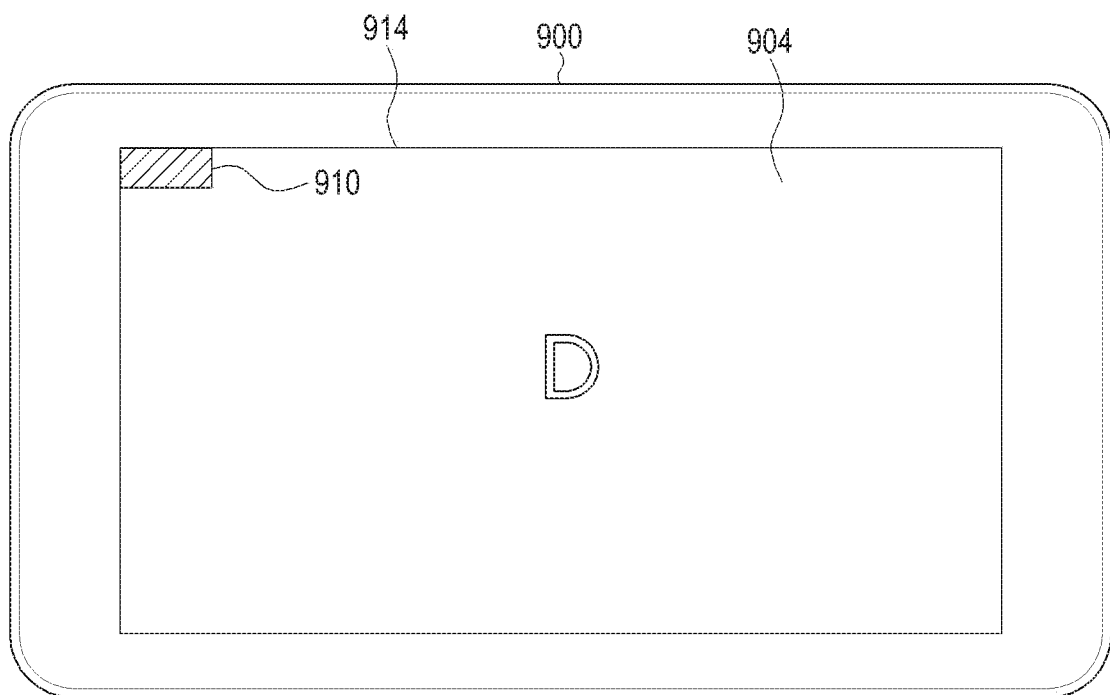

As illustrated in FIG. 9C, when the drag gesture arrives at a touch screen boundary line and the center button 910 arrives at an edge of the touch screen, the controller (not illustrate) may execute a control to discontinue display of the first window 901, the second window 902, and the third window 903. The controller (not illustrated) may execute a control to further enlarge the width and the height of the fourth window 904, so as to display the window in the entire touch screen. The controller (not illustrated) may execute a control to discontinue display of the dividing lines.

Figure 9D:
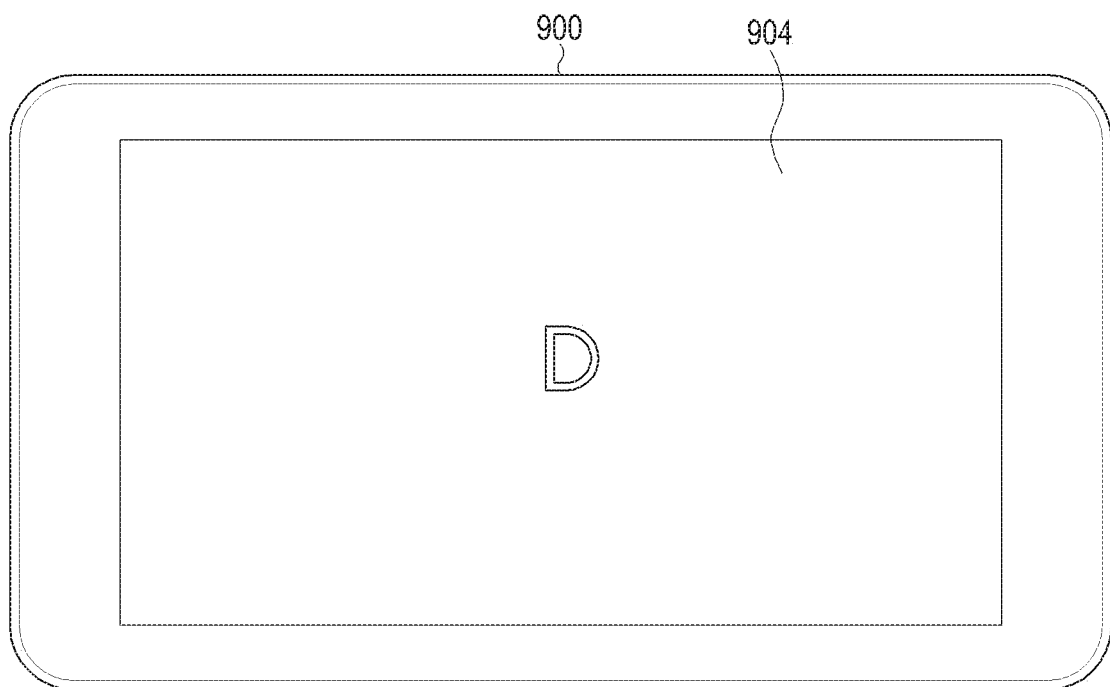

Referring to FIG. 9D, the user may terminate inputting the drag gesture. The controller (not illustrated) may determine that inputting a drag gesture is terminated based on the fact that a touch of the drag gesture is released. The controller (not illustrated) may execute a control to discontinue display of the center button 910, as illustrated in FIG. 9D. For example, the controller (not illustrated) may execute a control to discontinue display of the center button 910 after a predetermined period of time from the termination of the drag gesture input.

Figure 10A:
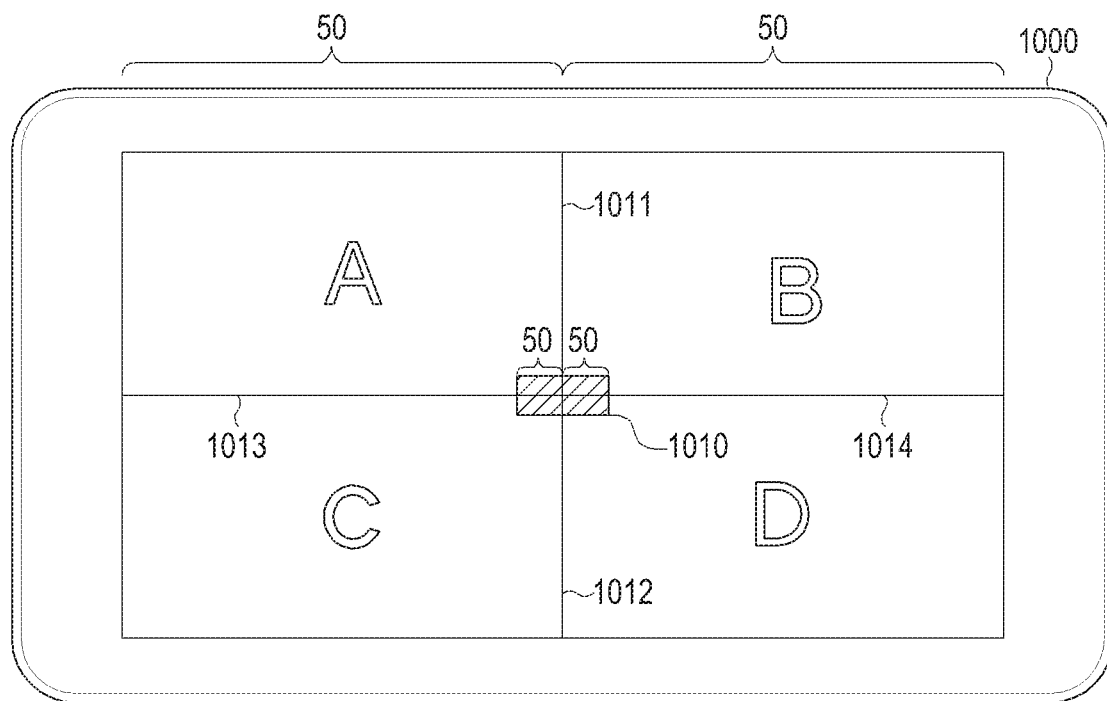
FIGS. 10A, 10B, and 10C are conceptual diagrams illustrating a display device that displays a center button according to various embodiments of the present disclosure.
Figure 10B:
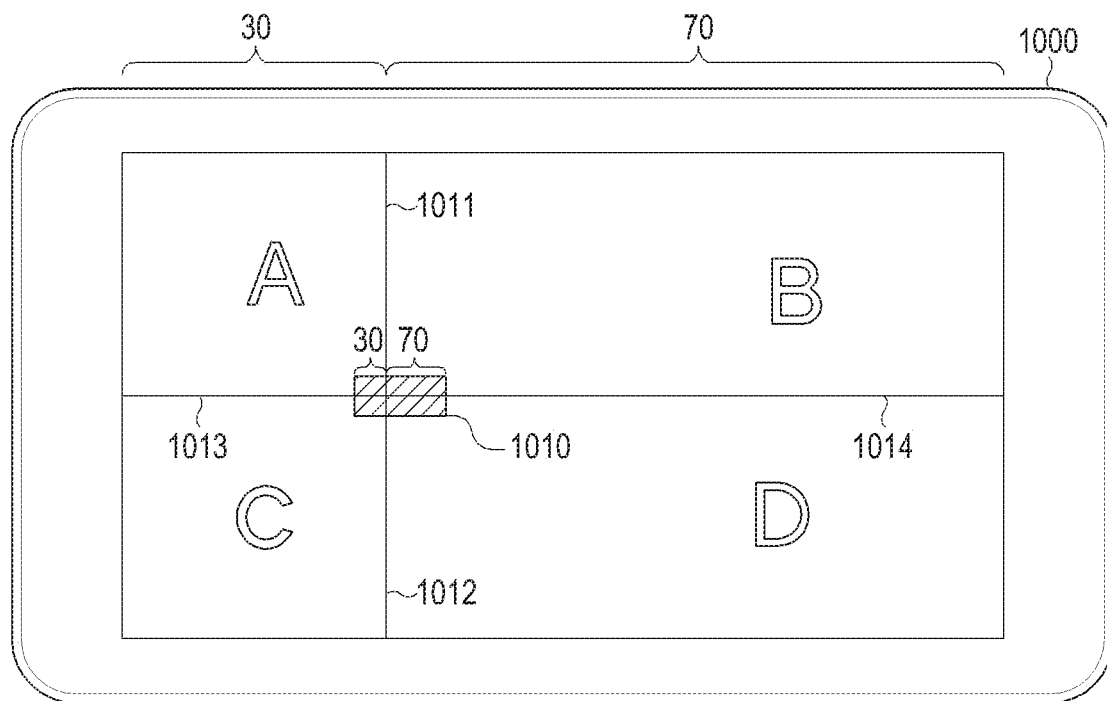
Figure 10C:
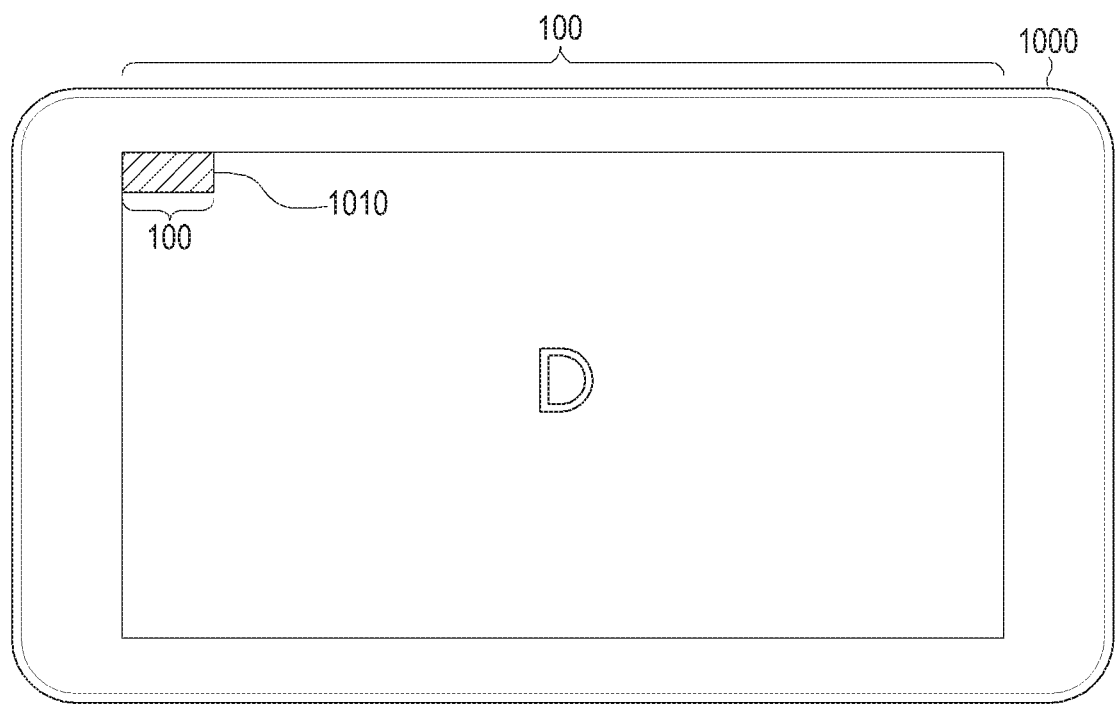

FIGS. 10A through 10C are conceptual diagrams illustrating a display device that displays a center button according to various embodiments of the present disclosure.

As illustrated in FIG. 10A, a display device 1000 may display a center button 1010 at the center of a touch screen. Although FIGS. 10A through 10C illustrate that the center button 1010 is in a quadrangular shape, this is merely an example, and the present disclosure may include a polygonal shape, a circular shape, and an oval shape, in addition to the quadrangular shape. Additionally, a controller (not illustrated) may execute a control to display a first dividing line 1011, a second dividing line 1012, a third dividing line 1013, and a fourth dividing line 1014, which are connected with the center button 1010. Particularly, the controller (not illustrated) may recognize a location of the center button 1010 on the touch screen. For example, in FIG. 10A, it is recognized that the controller (not illustrated) is located at the center of the touch screen, that is, at a point that divides the width into 50:50. The controller (not illustrated) may determine locations of the first dividing line 1011 and the second dividing line 1012, based on the location of the center button on the touch screen. For example, the controller (not illustrated) may execute a control to display the first dividing line 1011 and the second dividing line 1012 to be connected with a point that devices a width of the center button 1010 into 50:50, based on the fact that the center button is located at the point that divides the width of the touch screen into 50:50.

FIG. 10B is a conceptual diagram illustrating a display device according to another embodiment of the present disclosure. As illustrated in FIG. 10B, a display device 1000 may display the center button 1010 at a point that divides the width of the touch screen into 30:70. The controller (not illustrated) may recognize a location of the center button 1010 on the touch screen. Additionally, the controller (not illustrated) may execute a control to display the first dividing line 1011 and the second dividing line 1012 to be connected with a point that divides a width of the center button 1010 into 30:70, based on the fact that the center button 1010 is located at the point that divides the width of the touch screen into 30:70.

As illustrated in FIG. 10C, when the center button 1010 is disposed at a touch screen boundary line, the controller (not illustrated) may execute a control to discontinue display of dividing lines.

Figure 11:
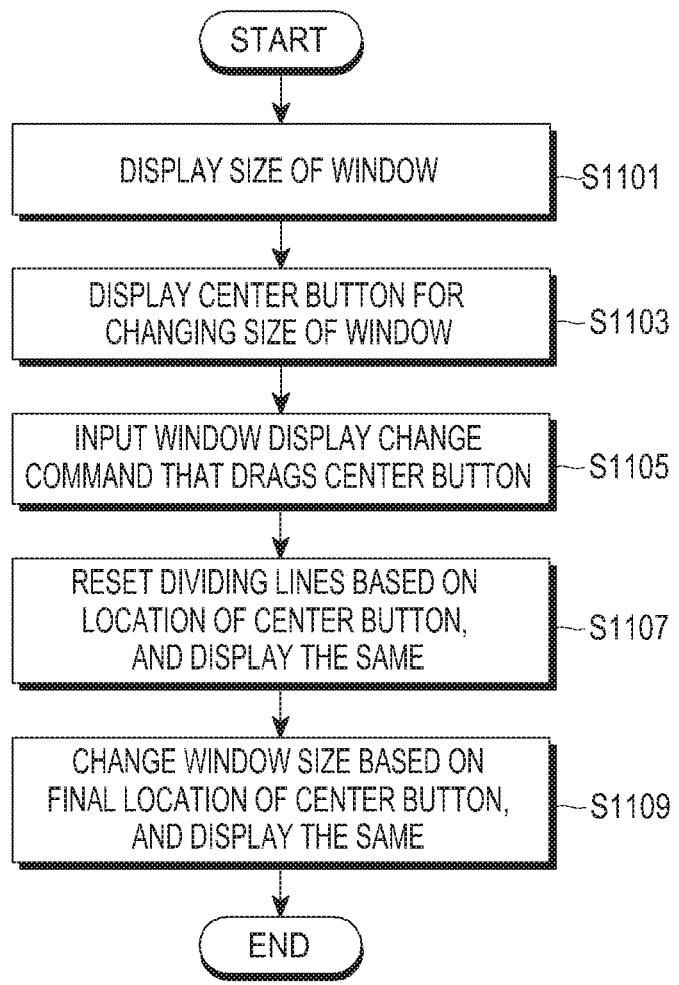
FIG. 11 is a flowchart illustrating a method of controlling a display device according to an embodiment of the present disclosure.

FIG. 11 is a flowchart illustrating a method of controlling a display device according to an embodiment of the present disclosure.

A display device displays a plurality of windows in operation S1101. The display device may display a plurality of dividing lines that distinguishes a plurality of windows. Additionally, the display device displays a center button for controlling the display of a window, at an intersection of the plurality of dividing lines, in operation S1103.

The display device may receive an input of a window size change command that drags the center button in operation S1105. The display device may recognize a location of the center button on the touch screen. The display device may reset the dividing lines based on the location of the center button on the touch screen, and may display the same in operation S1107. For example, the display device may recognize that the center button is located at a point that divides the touch screen based on a predetermined ratio. The display device may display the dividing lines to be connected with a point that divides the center button based on the predetermined ratio. Additionally, the display device may change a window size based on a final location of the center button, and may display the same in operation S1109.

FIGS. 12A through 12D are conceptual diagrams illustrating a method of executing a full screen mode according to another embodiment of the present disclosure.

Figure 12A:
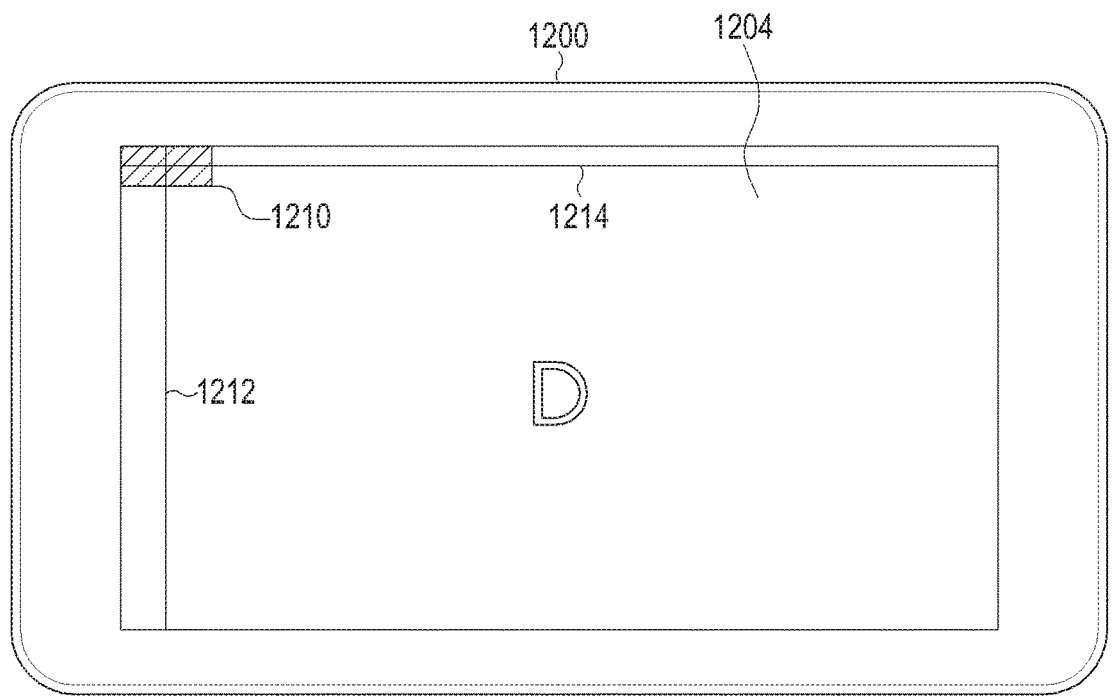
FIGS. 12A, 12B, 12C, and 12D are conceptual diagrams illustrating a method of executing a full screen mode according to another embodiment of the present disclosure.
Figure 12B:
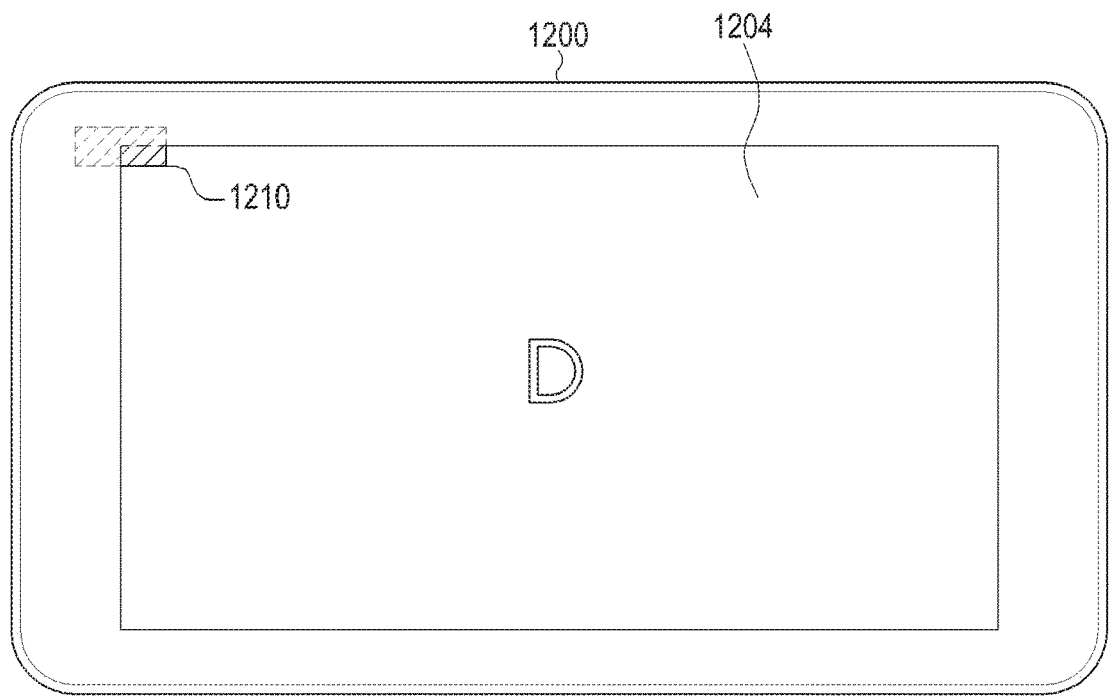
Figure 12C:
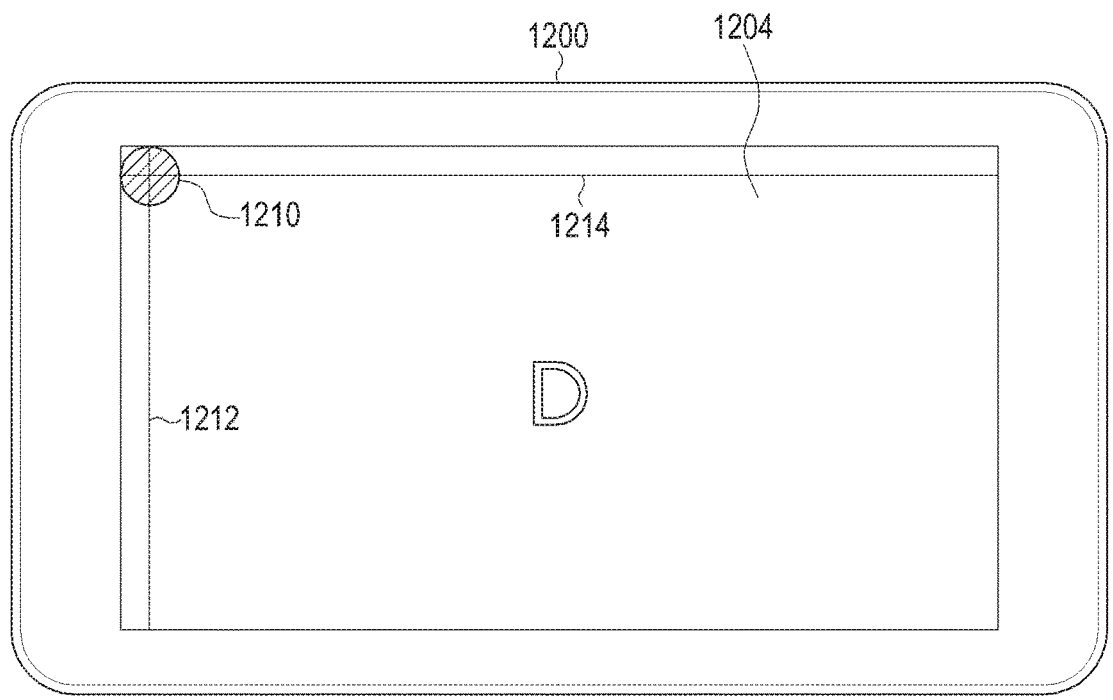

As illustrated in FIG. 12A and FIG. 12C, a display device 1200 may display any one of a quadrangular shape center button 1210 in FIG. 12A and a circular shape center button 1210 of FIG. 12C, to be in contact with a touch screen boundary line. Although FIGS. 12A through 12D illustrate that the center button 1210 is in a quadrangular shape or a circular shape, this is merely an example, and the present disclosure may include a polygonal shape and an oval shape, in addition to the quadrangular shape and the circular shape. In addition to the various shapes, the present disclosure may include various shapes of buttons, which a user may move on the touch screen. The second dividing line 1212 and the fourth dividing line 1214 may be displayed to be connected with the center button 1210. Accordingly, a fourth window 1204 may not be displayed in a full screen.

Figure 12D:
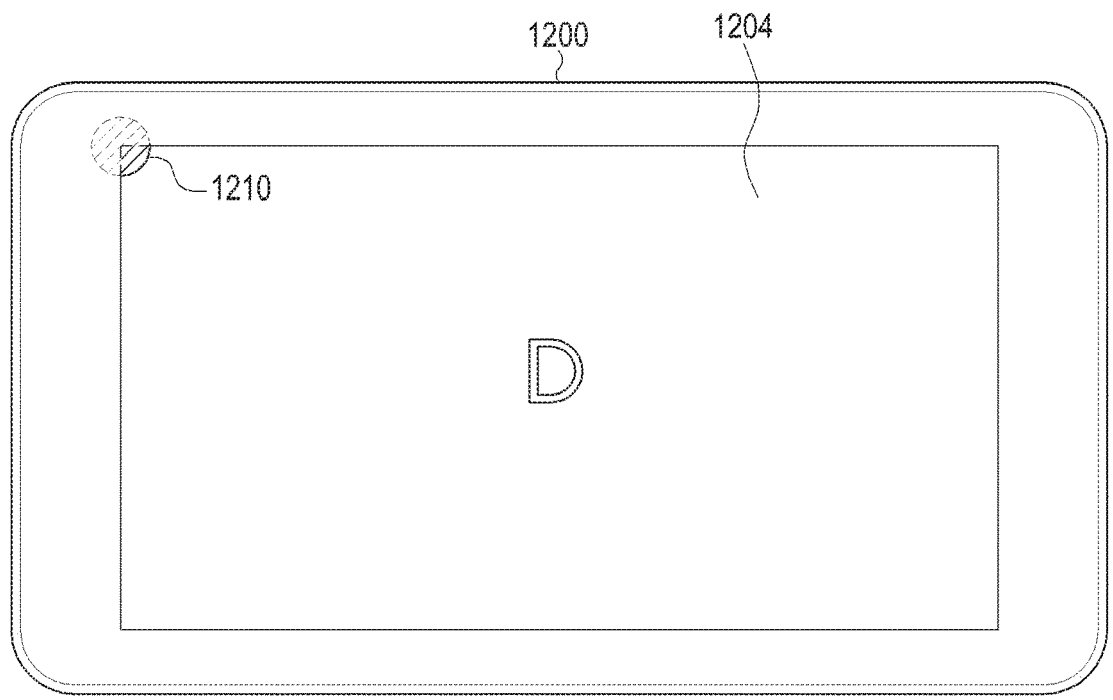

Accordingly, a controller (not illustrated) may further receive an additional drag gesture, even when the center button 1210 is in contact with a touch screen boundary line. The controller (not illustrated) may display a part of the center button 1210, in response to the additional drag gesture, as illustrated in FIG. 12B and FIG. 12D. Additionally, the controller (not illustrated) may execute a control to discontinue display of dividing lines when the center of the center button 1210 is not displayed. Accordingly, the fourth window 1204 may be displayed in a full screen.

Figure 13:
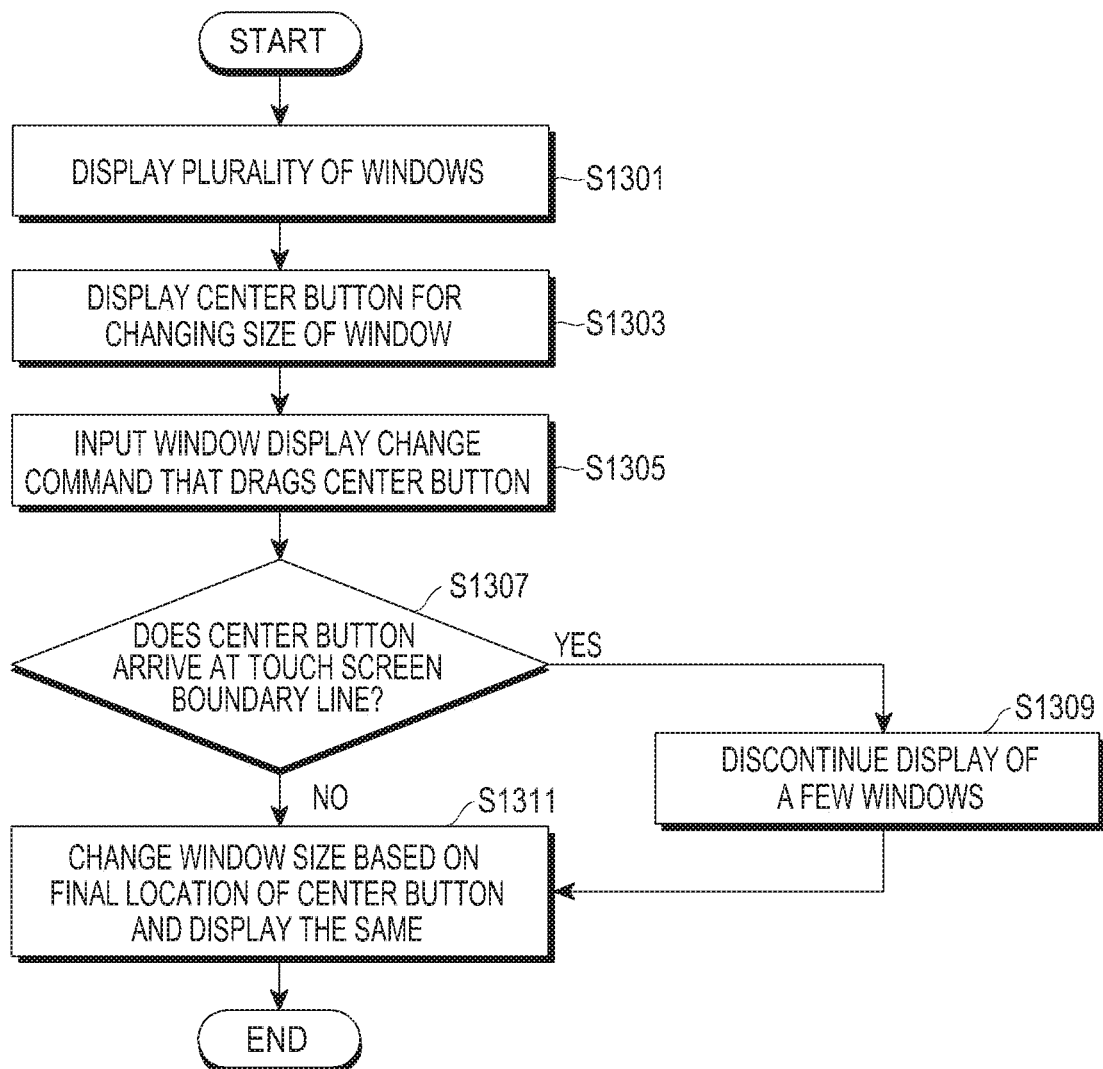
FIG. 13 is a flowchart illustrating a method of controlling a display device according to an embodiment of the present disclosure.

FIG. 13 is a flowchart illustrating a method of controlling a display device according to an embodiment of the present disclosure.

A display device may display a plurality of windows in operation S1301. The display device may display a plurality of dividing lines that distinguishes a plurality of windows. Additionally, the display device may display a center button for controlling the display of a window, at an intersection of the plurality of dividing lines, in operation S1303.

The display device may receive an input of a window size change command that drags the center button in operation S1305. The display device may display the center button at a point where the drag gesture is made.

The display device may determine whether the center button arrives at a touch screen boundary line and is in contact with the touch screen boundary line, in operation S1307. When the center button is located to be in contact with the touch screen boundary line in operation S1307—Yes, the display device may display only a part of the center button and may discontinue display of dividing lines in operation S1309. When the center button is not in contact with the touch screen boundary line in operation S1307—No, the display device may change a window size based on a final location of the center button and display the same in operation S1311. In the case of operation S1309, the display device may display a predetermined window in a full screen.

Figure 14A:
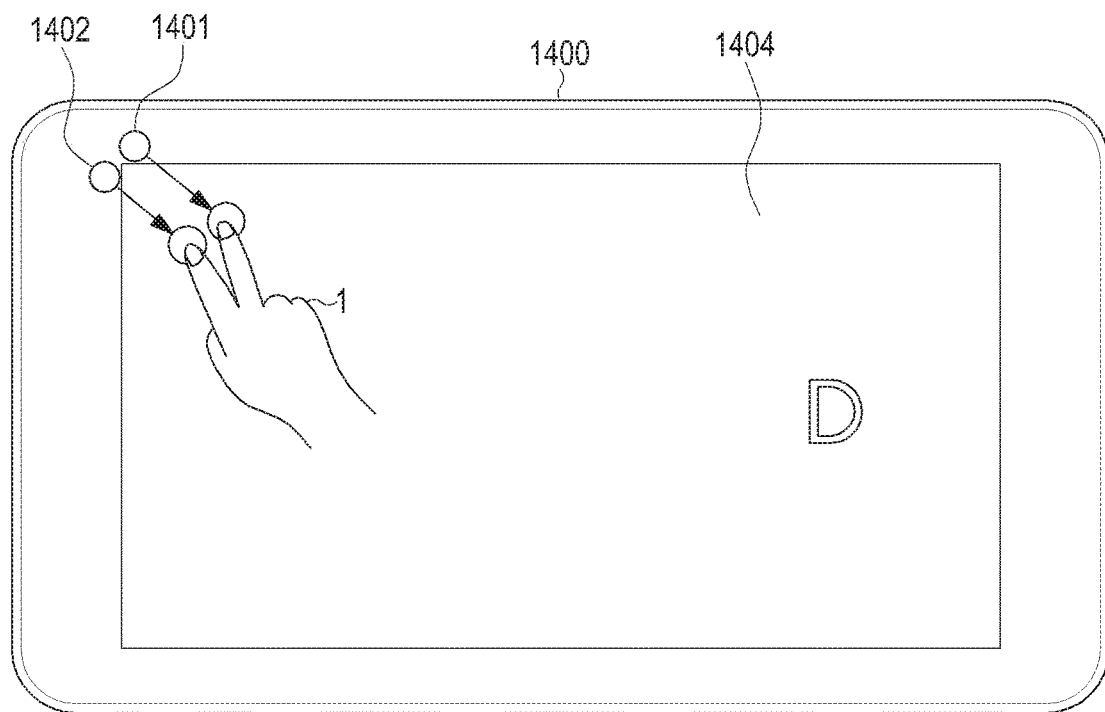
FIGS. 14A and 14B are conceptual diagrams illustrating a display device, for describing an embodiment that generates and displays a center button again.
Figure 14B:
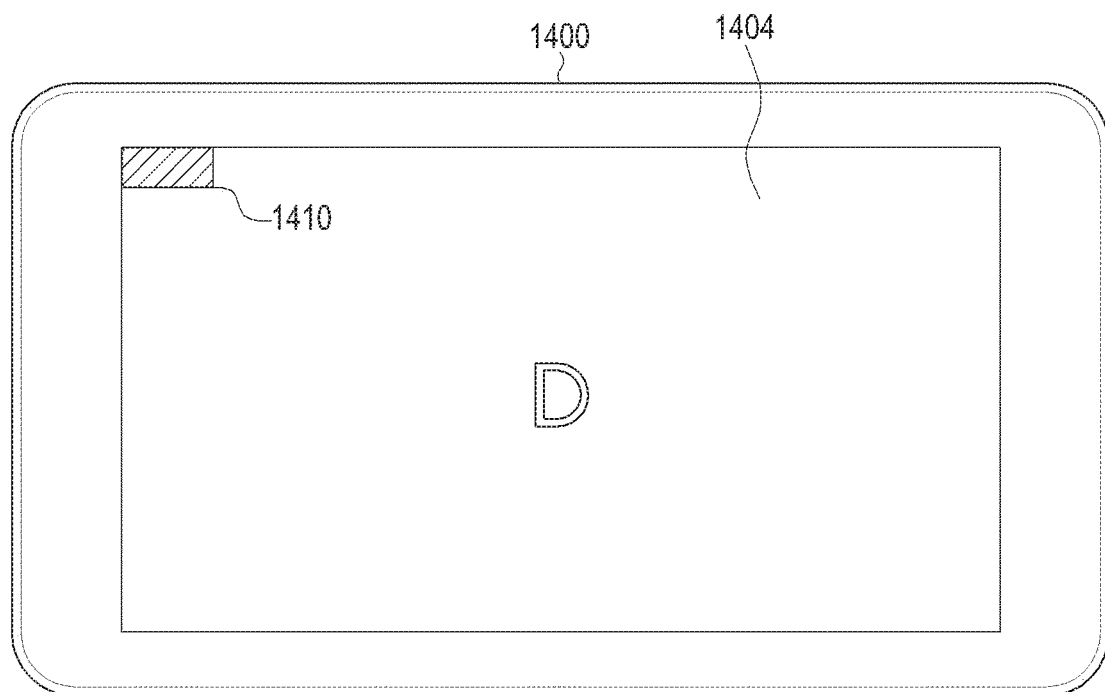

FIGS. 14A and 14B are conceptual diagrams illustrating a display device, for describing an embodiment that generates and displays a center button again.

Referring to FIG. 14A, a display device 1400 may display a predetermined window 1404 in a full screen. In the case of a full screen mode, the display device 1400 may execute a control to discontinue display of a center button and dividing lines. The user 1 may desire to display the center button again, and accordingly, may input a center button generate command. Referring to FIG. 14A, the center button generate command may be double edge flicks 1401 and 1402 which are simultaneously input from the upper side boundary line and the left boundary line of the touch screen. In FIG. 14A, the double edge flicks simultaneously input from the upper side boundary line and the left boundary line of the touch screen, is merely an example, and there is no limit to a touch screen boundary line from where double edge flicks are input. In addition, those skilled in the art may modify a center button generate command in various manners, in addition to the double edge flicks, and the scope of the right of the present disclosure may not be limited by the features of the center button generate command.

Referring to FIG. 14B, the controller (not illustrated) may execute a control to display a center button 1410 again, based on the center button generate command. Although FIG. 14B illustrates that the center button 1410 is in a quadrangular shape, this is merely an example, and the present disclosure may include a polygonal shape, a circular shape, and an oval shape, in addition to the quadrangular shape. Also, the controller (not illustrated) may execute a control to display the center button 1410 again in a latest location where the center button 1410 was located.

Figure 15:
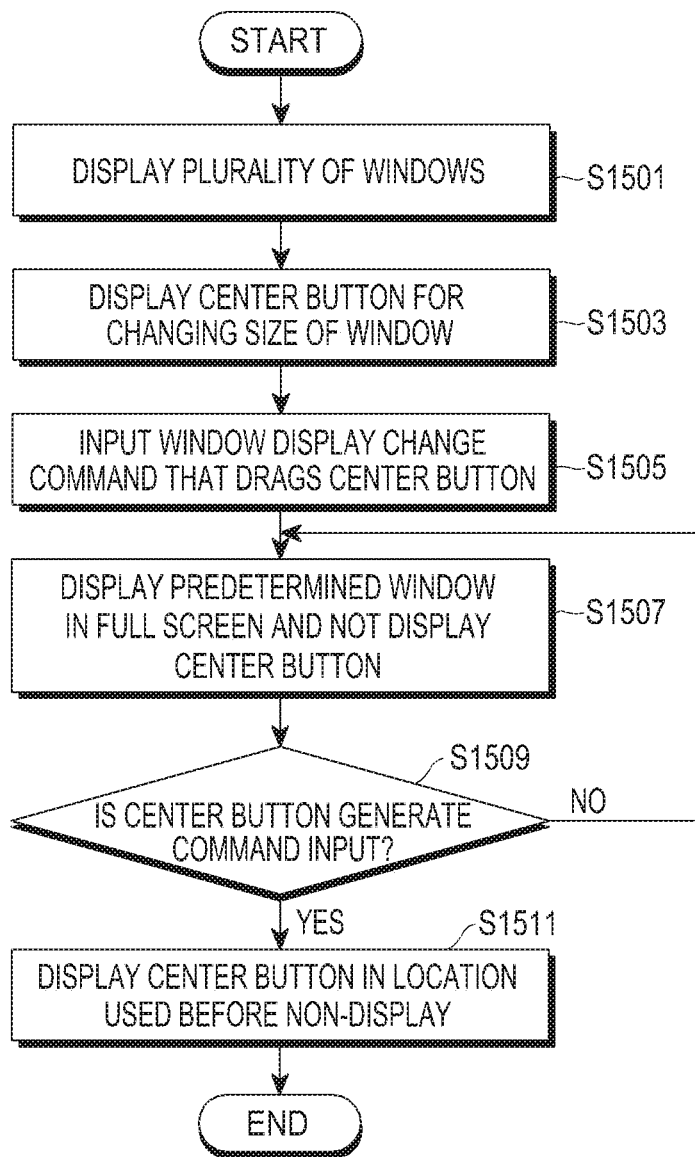
FIG. 15 is a flowchart illustrating a method of controlling a display device according to an embodiment of the present disclosure.

FIG. 15 is a flowchart illustrating a method of controlling a display device according to an embodiment of the present disclosure.

A display device may display a plurality of windows in operation S1501. The display device may display a plurality of dividing lines that distinguishes a plurality of windows. Additionally, the display device may display a center button for controlling the display of a window, at an intersection of the plurality of dividing lines, in operation S1503.

The display device may receive an input of a window size change command that drags the center button in operation S1505. The display device may display the center button at a point where the drag gesture is made.

The display device may execute a control to display a predetermined window in a full screen in response to the window size change command, and to discontinue display of the center button, in operation S1507. The display device determines whether the center button generate command is input in operation S1509. When the center button generate command is not input in operation S1509—N, the display device may maintain a full screen mode. When the center button generate command is input in operation S1509—Y, the display device may display the center button in a location used before non-display, that is, in a latest location where the center button was located, in operation S1511.

It may be appreciated that the various embodiments of the present disclosure may be implemented in software, hardware, or a combination thereof. Any such software may be stored, for example, in a volatile or non-volatile storage device such as a ROM, a memory such as a RAM, a memory chip, a memory device, or a memory integrated circuit (IC), or a recordable optical or magnetic medium such as a compact disc (CD), a digital versatile disc (DVD), a magnetic disk, or a magnetic tape, regardless of its ability to be erased or its ability to be re-recorded. Also, it will be appreciated that a graphic screen updating method according to the present disclosure may be implemented by a computer or a portable terminal which includes a controller and a memory, in which the memory may be an example of a non-transitory storage medium that is readable by a machine that is suitable for storing one or more programs that include instructions for implementing the various embodiments of the present disclosure. Accordingly, the present disclosure includes a program including a code for implementing the apparatus and method described in the appended claims of the specification and a non-transitory machine (computer or the like)-readable storage medium for storing the program. Further, the program may be electronically transferred by a predetermined medium such as a communication signal transferred through a wired or wireless connection, and the present disclosure appropriately includes equivalents of the program.

Further, the device can receive the program from a program providing apparatus connected to the device wirelessly or through a wire and store the received program. The program supply apparatus may include a program that includes instructions to execute the various embodiments of the present disclosure, a memory that stores information or the like used for the various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
    a touchscreen display; and
    at least one processor configured to:
        display a first screen of a first application in a first area, a second screen of a second application in a second area and a graphical object on a boundary line between the first screen and the second screen in a split view mode,
        receive a first touch input, on the touchscreen display, from the graphical object toward an edge of the touchscreen display, while the first screen, the second screen and the graphical object are being displayed in the split view mode on the touchscreen display, wherein the first touch input is a single touch gesture,
        based at least on reception of the first touch input, display the first screen in a full screen mode on the touchscreen display after removing the second screen and the graphical object from the touchscreen display,
        receive a second touch input from at least two points of the edge of the touchscreen display toward a center of the touchscreen display while the first screen is being displayed in the full screen mode on the touchscreen display, wherein the second touch input is a multi-touch gesture, and
        based at least on reception of the second touch input, display the first screen of the first application, the second screen of the second application in the split view mode on the touchscreen display, and the graphical object displayed at a same position the graphical object was positioned at prior to the first touch input after the second touch input is released.

2. The electronic device of claim 1, wherein the second touch input comprises a flick gesture.

3. The electronic device of claim 1, wherein the at least one processor is further configured to, in response to the first touch input, move a boundary splitting the first screen and the second screen with the graphical object toward a first edge in the split view mode.

4. The electronic device of claim 1, wherein the first touch input is received in a first direction, and the second touch input is received in a second direction opposite to the first direction.

5. The electronic device of claim 1, wherein the edge of the touchscreen display is perpendicular to the boundary line between the first screen and the second screen.

6. A method for controlling an electronic device, the method comprising:
    displaying, on a touchscreen display, a first screen of a first application in a first area, a second screen of a second application in a second area and a graphical object on a boundary line between the first screen and the second screen in a split view mode;
    receiving a first touch input, on the touchscreen display, from the graphical object toward an edge of the touchscreen display, while the first screen, the second screen and the graphical object are being displayed in the split view mode on the touchscreen display, wherein the first touch input is a single touch gesture;
    based at least on reception of the first touch input, displaying the first screen in a full screen mode on the touchscreen display after removing the second screen and the graphical object from the touchscreen display;
    receiving a second touch input from at least two points of the edge of the touchscreen display toward a center of the touchscreen display while the first screen is being displayed in the full screen mode on the touchscreen display, wherein the second touch input is a multi-touch gesture; and
    based at least on reception of the second touch input, displaying the first screen of the first application, the second screen of the second application in the split view mode on the touchscreen display, and the graphical object displayed at a same position the graphical object was positioned at prior to the first touch input after the second touch input is released.

7. The method of claim 6, wherein the second touch input comprises a flick gesture.

8. The method of claim 6, further comprising, in response to the first touch input, moving a boundary splitting the first screen and the second screen with the graphical object toward a first edge in the split view mode.

9. The method of claim 6, wherein the first touch input is received in a first direction, and the second touch input is received in a second direction opposite to the first direction.

10. The method of claim 6, wherein the edge of the touchscreen display is perpendicular to the boundary line between the first screen and the second screen.

11. A non-transitory computer readable storage medium storing instructions that when executed by at least one processor, perform a method for controlling an electronic device, the method comprising:
    displaying, on a touchscreen display, a first screen of a first application in a first area, a second screen of a second application in a second area and a graphical object on a boundary line between the first screen and the second screen in a split view mode;
    receiving a first touch input, on the touchscreen display, from the graphical object toward an edge of the touchscreen display, while the first screen, the second screen and the graphical object are being displayed in the split view mode on the touchscreen display, wherein the first touch input is a single touch gesture;
    based at least on reception of the first touch input, displaying the first screen in a full screen mode on the touchscreen display after removing the second screen and the graphical object from the touchscreen display;
    receiving a second touch input from at least two points of the edge of the touchscreen display toward a center of the touchscreen display while the first screen is being displayed in the full screen mode on the touchscreen display, wherein the second touch input is a multi-touch gesture; and based at least on reception of the second touch input, displaying the first screen of the first application, the second screen of the second application in the split view mode on the touchscreen display, and the graphical object displayed at a same position the graphical object was positioned at prior to the first touch input after the second touch input is released.

* * * * *